US009103349B2

(12) United States Patent
Oi et al.

(10) Patent No.: US 9,103,349 B2
(45) Date of Patent: Aug. 11, 2015

(54) DRIVING MOTOR

(75) Inventors: Shinichi Oi, Saitama (JP); Hiroki Jitsukawa, Saitama (JP); Kazuyoshi Horiuchi, Saitama (JP); Naoto Hayashi, Saitama (JP)

(73) Assignee: VALEO JAPAN CO., LTD., Saitama (JP)

( * ) Notice: Subject to any disclaimer, the term of this patent is extended or adjusted under 35 U.S.C. 154(b) by 742 days.

(21) Appl. No.: 13/265,735

(22) PCT Filed: Apr. 14, 2010

(86) PCT No.: PCT/JP2010/002679
§ 371 (c)(1),
(2), (4) Date: Dec. 14, 2011

(87) PCT Pub. No.: WO2010/122735
PCT Pub. Date: Oct. 28, 2010

(65) Prior Publication Data
US 2012/0074802 A1     Mar. 29, 2012

(30) Foreign Application Priority Data

| Apr. 23, 2009 | (JP) | 2009-105472 |
| Sep. 25, 2009 | (JP) | 2009-221040 |
| Sep. 25, 2009 | (JP) | 2009-221041 |
| Sep. 25, 2009 | (JP) | 2009-221042 |
| Apr. 9, 2010 | (JP) | 2010-090042 |
| Apr. 9, 2010 | (JP) | 2010-090061 |

(51) Int. Cl.
*H02K 5/22* (2006.01)
*F04D 25/08* (2006.01)
(Continued)

(52) U.S. Cl.
CPC .............. *F04D 25/08* (2013.01); *F04D 25/068* (2013.01); *F04D 29/668* (2013.01); *H02K 5/04* (2013.01);
(Continued)

(58) Field of Classification Search
CPC .................................. H02K 5/20; H02K 5/22
USPC ............................................ 310/64, 67 R, 89
See application file for complete search history.

(56) References Cited

U.S. PATENT DOCUMENTS 5,910,694 A * 6/1999 Yokozawa et al. ............... 310/89
6,198,184 B1 * 3/2001 Ohi et al. ..................... 310/68 C
(Continued)

FOREIGN PATENT DOCUMENTS

| JP | 2-139473 U | 11/1990 |
| JP | 05-001181 | 1/1993 |

(Continued)

OTHER PUBLICATIONS

Brief English language translation for JP 2-139473U, 2 pages. Unexamined Utility Model application cannot be downloaded, Date: Nov. 21, 1990.
(Continued)

*Primary Examiner* — Naishadh Desai
(74) *Attorney, Agent, or Firm* — Howard & Howard Attorneys PLLC

(57) ABSTRACT

Provided is a driving motor that will meet the requests of making the length of a rotating axis of the driving motor to be shorter in the axial direction, and which will also have waterproof, vibration resistance, and soundproof characteristics. In this driving motor (3); a motor interior-space (35) is formed by a housing (21) that has a first and second opening and which is formed to be cylinder shaped, and a flange (22) that blocks the second opening of this housing (21); and a stator assembly (18), a rotor assembly (20), a lower-side end section of the rotating axis (12) that has been placed lower than the flange (22) up until now, and a control circuit-board (19) are all made to be contained in this motor interior-space (35). Furthermore, a ring-shaped elastic member (45) is made to interpose between the upper-side end section of the rotating axis (12) and the first opening of the housing (21); and the lower-side end section of the rotating axis (12), the stator assembly (18), and the rotor assembly (20) are made to be fixed to the flange (22) through a mounting elastic member (59).

10 Claims, 17 Drawing Sheets

(51) Int. Cl.

| | |
|---|---|
| *H02K 5/20* | (2006.01) |
| *F04D 29/66* | (2006.01) |
| *H02K 5/04* | (2006.01) |
| *H02K 5/10* | (2006.01) |
| *H02K 5/18* | (2006.01) |
| *H02K 5/24* | (2006.01) |
| *H02K 7/14* | (2006.01) |
| *H02K 11/00* | (2006.01) |
| *F04D 25/06* | (2006.01) |

(52) U.S. Cl.
CPC .. *H02K 5/10* (2013.01); *H02K 5/18* (2013.01); *H02K 5/20* (2013.01); *H02K 5/22* (2013.01); *H02K 5/24* (2013.01); *H02K 7/14* (2013.01); *H02K 11/0073* (2013.01)

(56) References Cited

U.S. PATENT DOCUMENTS

| | | | |
|---|---|---|---|
| 6,339,267 B1 * | 1/2002 | Fujii et al. | 310/51 |
| 6,566,776 B2 * | 5/2003 | Hoffmann et al. | 310/91 |
| 7,034,418 B2 * | 4/2006 | Matsumoto | 310/67 R |
| 7,567,000 B2 * | 7/2009 | Sugiyama et al. | 310/64 |
| 2007/0122293 A1 * | 5/2007 | Sugiyama et al. | 417/354 |
| 2007/0176507 A1 * | 8/2007 | Tsuji | 310/156.01 |

FOREIGN PATENT DOCUMENTS

| | | |
|---|---|---|
| JP | 10-191595 | 7/1998 |
| JP | 10-304640 | 11/1998 |
| JP | 2001145300 A | 5/2001 |
| JP | 2003-219622 | 7/2003 |
| JP | 2006-217748 | 8/2006 |
| JP | 2010-059847 A | 3/2010 |

OTHER PUBLICATIONS

English language translation and abstract for JP 05-001181 extracted from Searching PAJ database on Oct. 13, 2011, 23 pages.
English language translation and abstract for JP 10-304640 extracted from Searching PAJ database on Oct. 13, 2011, 24 pages.
English language translation and abstract for JP 10-191595 extracted from Searching PAJ database on Oct. 13, 2011 22 pages.
English language abstract for JP 20011145300 extracted from espacenet.com database on Oct. 13, 2011, 14 pages.
English language translation and abstract for JP 2003-219622 extracted from Searching PAJ database on Oct. 13, 2011, 45 pages.
English language translation and abstract for JP 2006-217748 extracted from Searching PAJ database on Oct. 13, 2011, 39 pages.
English language translation and abstract for JP 2010-059847 extracted from Searching PAJ database on Dec. 13, 2011, 22 pages.
International Search Report for PCT/JP2010/002679, dated Jul. 6, 2010, 5 pages.

* cited by examiner (a)

(b)

(a)

(b)

DRIVING MOTOR

RELATED APPLICATIONS

This application claims priority to and all the advantages of International Patent Application No. PCT/JP2010/002679, filed on Apr. 14, 2010, which claims priority to Japanese Patent Application No. 2009-105472, filed on Apr. 23, 2009, Japanese Patent Application No. 2009-221041, filed on Sep. 25, 2009, Japanese Patent Application No. 2009-221042, filed on Sep. 25, 2009, Japanese Patent Application No. 2009-221040, filed on Sep. 25, 2009, Japanese Patent Application No. 2010-090042, filed on Apr. 9, 2010, and Japanese Patent Application No. 2010-090061, filed on Apr. 9, 2010.

TECHNICAL FIELD

The present invention relates to a motor for driving a predetermined air-conditioning device such as a fan, where the motor being housed in a case with an air flow duct, such as a blower case of a blower unit, which may configure a vehicle air conditioner.

BACKGROUND ART

In recent years, there is a need for a more efficient driving motor for a blower, smaller than a conventional motor, for a vehicle air conditioner or a ventilation device for a hybrid vehicle. Thus, there is required development of a driving motor having excellent water-proof and heat releasing characteristics, having a smaller size along the axial direction of a rotating shaft of a blower, and reducing the manufacturing cost.

In this case, for example, a vehicle-mounted blower equipped with a brushless motor as mentioned in Patent Document 1 is already known. The vehicle-mounted blower disclosed in Patent Document 1 is provided with a brushless motor that rotates a blower fan, a cooling fin molded in a single body in a metallic housing of the brushless motor, an auxiliary blade arranged in the blower fan to produce an air flow around the cooling fin, and a driving element closely attached to the housing. The objective thereof is to increase the cooling capacity of the motor driving element and reduce the size in a height direction of the blower as well as to take measures to curtail the manufacturing cost by reducing the number of parts.

Moreover, it is known that when an external air introducing mode is selected in the blower unit of the vehicle air conditioner and the external air is introduced from outside the vehicle interior, in case of rain, a misty rain water together with the external air enters the blower so that water drops adhere to electric devices such as an armature, contained in the driving motor and give rise to a problem of the insulation of the electric devices such as an armature, or a problem of rust such as in the component parts.

In response thereto, as mentioned in Patent Document 2, there is known a motor configured such that an interior space is formed by a metallic casing extended in an umbrella shape that opens from a rotating shaft below both blade wheel boss part and cone part that extends from the boss part, and a non metallic (for example, resin made) bottom plate that can cover a lower opening of this casing, the armature is housed in the interior space, and the casing and the bottom plate are fixed tightly and closely by screwing outwardly extending two flanges formed at the circumferential edge.

Moreover, there is already known a brushless motor as disclosed in Patent Document 3, for example. Although the brushless motor is directed at the use for a compressor unit of a home use air-conditioner rather than the blower unit of the vehicle air conditioner, it has a structure to prevent water from entering the motor interior-space when this compressor unit of the air conditioner is sprayed with water. In short, the brushless motor has a water-proof structure including a cylindrical casing. The cylindrical casing has a stator to be protected from water and is divided into left-right two cup-shaped casings at a vertical plane in the general center of the size of a rotating shaft direction. On a surface formed by connecting the left-right cup-shaped casings, a protrusion is arranged on one surface of the cup-shaped casing and a groove is arranged on the other surface of the cup-shaped casing, the protrusion is inserted into the groove, and an O-shaped ring is provided between the groove and the protrusion, whereby the left-right cup-shaped casings are airtightly joined.

Moreover, Patent Document 4 discloses a driving motor for a blower unit of a vehicle air conditioner having a structure wherein a rotor assembly is rotated by appropriately switching the magnetic power between a stator assembly and a rotor assembly, which are component parts of a magnetic circuit, and a rotating shaft is rotated along therewith. In this Document, it is known that magnetic vibrations are generated in a rotating direction (a radial direction of the rotating shaft) of the driving motor at the time of switching the magnetic power. Further, a driving motor for a blower unit of a vehicle air conditioner is disclosed in FIG. 5 of Patent Document 4. The driving motor is structured such that a rotor member such as a multi-blade fan is attached to one side end along an shaft direction of a rotating shaft and the rotor member is rotated to take in air and blow air in a predetermine direction. In this technology, it is known that there occurs a movement in which both ends of the rotating shaft rotate while drawing a circle as if to squeeze a pestle (hereinafter referred to as "precession") from various factors such as an air flow taken in or minute core misalignment of the rotating shaft.

If the two vibration components, magnetic vibration and vibration due to precession, are kept as it is, noise will be generated from the driving motor. In order to control these vibrations, a structure of the brushless motor is described in the claims of Patent Document 4. The rotor is rotatably supported in the stator and the lower end of the center piece of the stator is fixed in the motor holder through a vibration-proof material. Then, the structure of a vibration-proof material of the brushless motor disclosed in Patent Document 4 is summarized by describing the detailed description of Patent Document 4. The vibration-proof material is made of rubber having hardness from 20 to 40 in a generally cylindrical shape with a cylindrical through-hole in the central part. The inner diameter has the smallest size in the central region in the axial direction of the through-hole, and the inner diameter of the through-hole gradually expands towards the both openings. An annular groove is formed in the axial direction central region of the rubber cylinder outer surface.

PRIOR ART DOCUMENTS

Patent Document

Patent Document 1: Japanese Patent Application Laid-Open No. 10-191595
Patent Document 2: Japanese Utility Model Application Laid-Open No. 2-139473
Patent Document 3: Japanese Patent Application Laid-Open No. 10-304640

Patent Document 4: Japanese Patent Application Laid-Open No. 2001-145300

SUMMARY OF THE INVENTION

Problem to be Solved by the Invention

However, the brushless motor of the vehicle-mounted blower disclosed in Patent Document 1 is configured such that the lower case is arranged at the lower side of the upper case to form a chamber for installing a control circuit-board. Because the control circuit-board is stored in the this chamber, and the chamber has a convex portion bloated below the upper case, causes a problem that the vehicle-mounted blower has to be installed in the duct while the convex portion is protruding outside the duct.

The brushless motor of the vehicle-mounted blower disclosed in Patent Document 1 has a problem that the structure becomes complex because the cooling fin which dissipates heat produced from the elements on the control circuit-board faces the blower fan side. As a result, the manufacturing cost of the brushless motor is also relatively high. Then, the brushless motor disclosed in Patent Document 1 has another problem that the component parts of the blushless motor is prone to rust due to insufficient water-proof measures, regardless of the blushless motor to be used in a vehicle-mounted blower.

Further, the brushless motor of the vehicle-mounted blower disclosed in Patent Document 2 is configured such that the lower case is arranged at the lower side of the upper case to form the control circuit-board chamber in which the control circuit-board is installed, so that there is the convex portion bloated below the upper case. Thus, this motor has a problem that the vehicle-mounted blower has to be arranged in the duct while the convex portion is protruding outside the duct.

The brushless motor of the vehicle-mounted blower disclosed in Patent Document 2 has a problem that the structure becomes complex because the cooling fin which dissipated heat produced from the elements on the control circuit-board is facing the blower fan. As a result, the manufacturing cost of the brushless motor is also relatively high. Then, the brushless motor disclosed in Patent Document 2 has another problem that the component parts of the blushless motor are easily rusted due to insufficient water-proof measures regardless of the blushless motor being used in a vehicle-mounted blower.

Moreover, when the vibration-proof material disclosed in Patent Document 4 is used, the structure thereof is relatively complex and of particular design. Thus, the manufacturing cost of the vibration-proof material is relatively increased, and further, the manufacturing cost of the driving motor made of this vibration-proof material is relatively high.

Therefore, a first objective of the present invention is to meet a demand of making the length of a rotating shaft of the driving motor to be shorter in the axial direction. A second objective is to achieve a reduction in manufacturing cost and to ensure water-proof performance of a motor interior-space by inhibiting a vibration transmission to a flange by means of attenuating a transmission amount of a vibration component caused by rain water that flows in together with the wind. A third objective thereof is to reduce the noise generation and achieve an enhanced quietness by surely attenuating vibrations transmitted to the flange, absorbing a magnetic vibration through a sophisticated flange structure, and alleviating a resonant sound.

Means for Solving the Problem

The driving motor according to the present invention is a driving motor for transmitting a rotation force to a rotor member so as to rotate the rotor member, wherein a motor main body includes: a rotating shaft for rotating the rotor member which is attached to one end in an axial direction; a rotor assembly being attached to the rotating shaft and rotating together with the rotating shaft; a stator assembly facing to the rotor assembly in a radial direction of the rotating shaft and being arranged not rotating together with the rotating shaft; a control circuit-board that controls rotation of the rotating shaft as well as the rotor assembly; and a housing having a first opening which is formed in the relatively vicinity of the rotor member and a second opening relatively spaced apart from the rotor member, whereas the housing extends from around of the rotating shaft to outward in radial direction of the rotating shaft at the vicinity of one end, where it opens at the other end of the axial direction of the rotating shaft, and the housing at the other end of the axial direction of the rotating shaft is covered by a flange, thus the housing and the flange defines a motor interior-space, and the housing, being made of a metal, is attached to a case in which an air duct is defined inside so that an external surface of the housing is exposed to the air duct, and at least the stator assembly is contained in the motor interior-space of the housing (claim 1). Herein, examples of the rotor member include a multi-blade fan and other rotatable parts which are installed in the blower case of the blower unit.

One end in the axial direction of the rotating shaft is protruding outwardly toward the rotor member side from the housing, and the other end in the axial direction of the rotating shaft is contained in the motor interior-space (claim 2).

Aspects of the driving motor according to the invention include: a driving motor for a blower unit for a large volume of air, wherein the rotor assembly is also contained in the motor interior-space of the housing, the control circuit-board is arranged to be contained in the motor interior-space of the housing, being located in the vicinity of one end of the rotating shaft than the rotor assembly and the stator assembly in the axial direction of the rotating shaft, and a yoke is disposed to be contained in the motor interior-space of the housing, being located in the vicinity of the other end in the axial direction of the rotating shaft (claim 3); and a driving motor for a blower unit for a small volume of air, wherein the rotor assembly is also contained in the motor interior-space of the housing, the control circuit-board is arranged to be contained in the motor interior-space of the housing, being located in the vicinity of the other end of the rotating shaft than the rotor assembly and the stator assembly in the axial direction of the rotating shaft, a yoke is disposed to be contained in the motor interior-space of the housing, being located in the vicinity of one end in the axial direction of the rotating shaft.

With these configurations, all the parts arranged below the flange in the conventional driving motors are arranged above the flange, and thus, a lower case attached below the flange is eliminated. As a result, the lower side of the driving motor is formed in a flat shape, and the size along the axial direction of the rotating shaft of the driving motor is made relatively smaller than the thickness of the lower case of the conventional driving motors.

The driving motor according to the present invention is characterized in that an elastic ring member is provided in a cylindrical gap between the first opening of the housing and the rotating shaft (claim 5). Therefore, the first opening of the housing and the rotating shaft are sealed, and therefore, there is no gap therebetween. As a result, it is possible to prevent water such as rain water from entering the motor interior-space through the gap between the first opening of the housing and the rotating shaft, and it is also possible to prevent the transmission of the rotation vibration from the rotating shaft to the housing because of the elasticity provided by the elastic ring member.

On the other hand, the driving motor according to the present invention may be characterized in that the rotor member includes a cone part that has a boss part to which the rotating shaft is fixed, the cone part which has a boss part and a first cylindrical part, which is positioned in outer circumference of the rotating shaft than the boss part and extending in axial direction toward the opposite end of the rotating shaft, while the housing has a second cylindrical part which extends in the axial direction of the rotating shaft to the boss part of the cone part and its outer radius being smaller than an inner radial size of the first cylindrical part, and it also has a first opening in which the rotating shaft is to be inserted the circumferential part of the first opening being extending toward the rotating shaft so as to form a flange, with witch, at a time of assembling the driving motor and the rotor member, the second cylindrical part, being housed in the first cylindrical part generates a space in a relatively complex manner (claim 6). This eliminates a need for the provision of the elastic ring member, and thus, the number of parts of the driving motor can be reduced.

The driving motor according to the present invention is characterized in that the rotating shaft, the rotor assembly, and the stator assembly which are integrally formed as a vibrator, and the vibrator is fixed to the flange through a elastic mounting member (claim 7). As a result, the interposed elastic mounting member can attenuate the transmission amount of vibrations, and thus, it is possible to inhibit the transmission of the vibration components from the vibration source to the flange.

The driving motor according to the present invention is characterized in that an elastic member is interposed between the housing and the flange at a time of covering the second opening side of the housing, the intervening elastic member to include three or more receiving parts each having a surface to interface the housing end surface which is opposing to the flange, wherein the receiving parts being arranged to surround the rotating shaft to support the motor main body (claim 8). As a result, when the second opening side of the housing is covered by the flange, the flange indirectly abuts the housing with the intervening elastic member in between. Thus, it is possible to inhibit a magnetic vibration, generated from component parts of a magnetic circuit or a vibration resulting from the precession of a rotating shaft, transmitted from the housing to the flange. Further, because the motor main body is supported in the receiving part and a contact area between the housing and the flange is reduced, silent rotation of the driving motor to can be realized. Moreover, the fact that the receiving parts are arranged at three locations or more to surround the rotating shaft makes the flange and the housing stably positioned, which can more effectively reduce precession.

It is preferable that the intervening elastic member is configured such that a spring constant in a rotating direction of the rotating shaft is smaller than a spring constant in an axial direction of the rotating shaft (claim 10). That is because the spring constant in the rotating direction of the rotating shaft is a numerical value corresponding to a magnetic vibration. The spring constant in the axial direction of the rotating shaft is a numerical value corresponding to a precession.

On the other hand, the driving motor according to the present invention may be characterized in that an elastic member is interposed between the housing and the flange at a time of covering the second opening side of the housing, the intervening elastic member to include a plurality of liner grooves in an area opposing to the second opening of the housing (claim 9). As a result, a vibration absorption effect of the intervening elastic member can be enhanced, and thus, it is possible to achieve a further noise reduction of the driving motor.

The driving motor according to the present invention is characterized in that the flange, at a time of covering the second opening side of the housing, the flange to includes a peripheral edge elastic member on its surface which is facing the second opening of the housing, whereas the peripheral edge elastic member being compressed by a pressing force generated by the housing in roughly a radial direction of the rotating shaft, while at the same time the peripheral edge elastic member contacts a region near the second opening on an outer peripheral surface of the housing so that a compressing force does not work in the axial direction of the rotating shaft (claim 11). Since peripheral edge elastic members are arranged in radial outer area of the flange surface which is facing the second opening of the housing, the inner surface in the radial direction of the rotating shaft of the peripheral edge elastic member contacts the housing, so that the plastic member is pressed by the housing toward the radial external side of the rotating shaft to be in compressed state. Consequently, water such as rain water can not enter the motor interior-space from the gap between the peripheral edge elastic member and the housing, thus the peripheral edge elastic member provides water-proof effect At the same time, there is no pressing force by the housing onto the surface in the axial direction, and thus, the peripheral edge elastic member is not compressed along the axial direction of the rotating shaft. As a result, it is possible to inhibit the transmission of the vibration component such as the magnetic vibration or the rotation vibration from the housing to the flange, and therefore, it is possible to provide a vibration attenuation effect by the peripheral edge elastic member.

The driving motor according to the present invention may be configured such that a heat dissipation accelerator for enhancing dissipation of heat generated in the motor interior-space to outside the motor interior-space is arranged on a surface facing the rotor member (claim 12). Herein, examples of the heat dissipation accelerator include a liner rib extending along the axial direction of the rotating shaft, a plurality of protrusions, and a plurality of recesses (dimples). These eliminate a need of providing a heat dissipation device such as a cooling fin and a heat sink.

The driving motor according to the present invention may be configured such that a surface facing the second opening of the housing of the flange has a rib which consists of a plurality of liner protrusions extending toward the housing (claim 13). Examples of the rib further include one which consists of both a plurality of liner protrusions radially extending toward the outer edge side from the rotating shaft and a plurality of liner protrusions concentrically arranged at predetermined intervals, where the rotating shaft is a center point, another one which has a plurality liner protrusions are arranged in a honeycomb shape, and another which has a plurality of liner protrusions are arrange in a hexagonal shape. As a result, the rigidity of the flange is relatively improved by the rib, the conventionally generated resonant sound due to the magnetic vibration resulting from the deformation of the flange surface can be reduced, and the magnetic vibration can be absorbed by the vibration-proof elastic member.

Effects of the Invention

Thus, according to these inventions, the metal housing that contains at least the stator assembly covers the stator assembly from above like an umbrella shape; it is possible to provide the stator assembly with a water-proof function. In addition, since the housing which is made of metal of excellent thermal conductivity contains the stator assembly in it and the external surface of it is exposed to an air duct of a case such as a blower case, the heat from the stator assembly is transmitted to the housing, and the heat from the control circuit-board is also transmitted to the housing. Accordingly, the external surface of the housing faces the air duct of the case, heat generated from the stator assembly can be easily dissipation from the external surface of the housing. As a result, it is possible to promote a decrease of a temperature of the whole driving motor. This eliminates a need of a heat dissipation device such as a heat sink, and thus, the driving motor can be made compact and manufacturing cost of the motor can be reduced while keeping excellent heat dissipation.

In particular, according to the invention described in claim 2, all the components arranged below the flange in the conventional driving motors are arranged upper side of the flange, and therefore, a need of a lower case attached at a lower portion of the flange in the conventional driving motors can be eliminated. As a result, the lower portion of the driving motor can be formed in a flat shape, and the size in the axial direction of the rotating shaft of the driving motor can be relatively made smaller by the thickness of the lower case of the conventional driving motors. Thus, it is possible to achieve a compact-sized driving motor, and even when the blower unit is installed in the duct, it is possible to prevent one portion of the driving motor from protruding to outside the duct, which results in improvement of the driving motor, as well as of the blower unit, in terms of layout.

Particularly, according to the inventions described in claims 3 and 4, the control circuit-board is also contained in the housing, and thus, it is possible to provide the control circuit-board with a water-proof function, which enables an elimination of a particular need of preparing a control circuit-board mounting space for installing the control circuit-board. Particularly, according to the inventions described in claims 3 and 4, although the heat from the control circuit-board is also transmitted to the housing, but the external surface of the housing is exposed to an air duct of the case, and thus, it is possible to dissipate the heat generated by the control circuit-board from the external surface of the housing. From this point, a need of a heat dissipation device such as a heat sink is eliminated. Thus, it is possible to further make the driving motor compact and reduce its manufacturing cost while keeping and improving the heat dissipating characteristic of the driving motor.

Particularly, according to the invention described in claim 5, since the gap between the first opening of the housing and the rotating shaft are air-tightly covered by interposing a elastic ring member, there is no gap between the first opening of the housing and the rotating shaft. As a result, it is possible to prevent water such as rain water from entering the motor interior-space through the gap, and it is also possible to prevent the transmission of the rotation vibration from the rotating shaft to the housing because the elastic ring member can attenuate the vibration.

Particularly, according to the invention described in claim 6, it is possible to prevent water such as rain water from entering the motor interior-space through a gap between the first opening of the housing and the rotating shaft even when the elastic ring member is not provided. Thus, the need of the elastic ring member can be eliminated, and the component count of the driving motor can be reduced. As a result, it is possible to reduce a manufacturing cost of the driving motor.

Particularly, according to the invention described in claim 7, the elastic mounting member that is inserted in the first opening can attenuate the transmission amount of the vibration component, and therefore, it is possible to inhibit the transmission of the vibration component from the vibration source to the flange.

Particularly, according to the invention described in claims 8 and claim 10, when the second opening of the housing is covered in a flange surface region facing the housing, the flange indirectly abuts the housing with the intervening elastic member in between, and the abutting area facing the second opening of the housing is relatively small, it is possible to prevent the transmission of a magnetic vibration generated from component parts of a magnetic circuit such as a rotor assembly and a vibration resulting from a precession of a rotating shaft from the housing to the flange, and it is possible to enhance the quietness of the driving motor.

Particularly, according to the invention described in claim 9, a vibration absorption effect can be enhanced by the intervening elastic member, and thus, it is possible to achieve a further noise reduction of the driving motor.

Particularly, according to the invention described in claim 11, since a peripheral edge elastic member is disposed in outer region in axial direction of the flange that is facing the second opening of the housing, and the inner surface in radial direction of the peripheral edge elastic member contacts the housing, the elastic member is pressed toward radial external direction and it is in compressed state. Therefore, the peripheral edge elastic member adheres closely to the outer peripheral surface of the housing, and water such as rain water does not enter the motor interior-space from the gap between the peripheral edge elastic member and the housing. As a result, it is possible to provide the peripheral edge elastic member with a water-proof effect. Moreover, there is no axial direction pressing force by the housing onto the surface of the peripheral edge elastic member, thus the peripheral edge elastic member is not compressed along the axial direction of the rotating shaft. As a result, it is possible to suppress the transmission of the magnetic vibration or the rotation vibration from the housing to the flange, and therefore, it is possible to provide the peripheral edge elastic member with a vibration insulation effect. This eliminates a need of applying a seal material for a water-proof to components of the motor disposed in the motor interior-space to realize a simple structure. Thus, it is possible to prevent the generation of noise from the driving motor while suppressing an increase of number of manufacture processes of the driving motor and an increase in manufacturing cost.

Particularly, according to the invention described in claim 12, it is not necessary to provide a heat dissipation device such as a cooling fin and a heat sink, and thus, it is possible to achieve a reduction in manufacturing cost of the driving motor.

Particularly, according to the invention described in claim 13, a vibration attenuation is enhanced by a vibration-proof elastic member, and thus, it is possible to achieve a further reduction of noise from the driving motor.

PREFERRED MODES FOR CARRYING OUT THE INVENTION

Hereinafter, embodiments of the present invention will be described with reference to the accompanying drawings.

Figure 1:
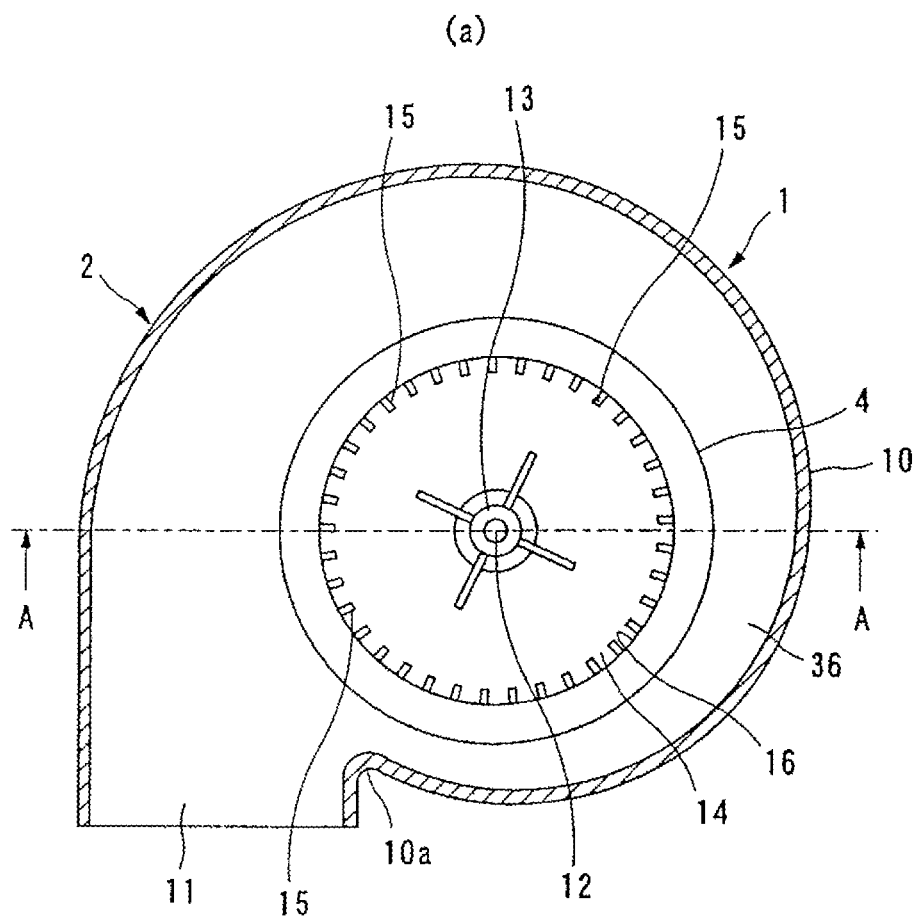
FIG. 1(a) is a diagram explaining a blower unit and a blower case storing the blower unit, using a driving motor for a small volume of air of the driving motor according to the present invention.
FIG. 1(b) is a cross section view taken along A-A line of FIG. 1(a).
Figure 1:
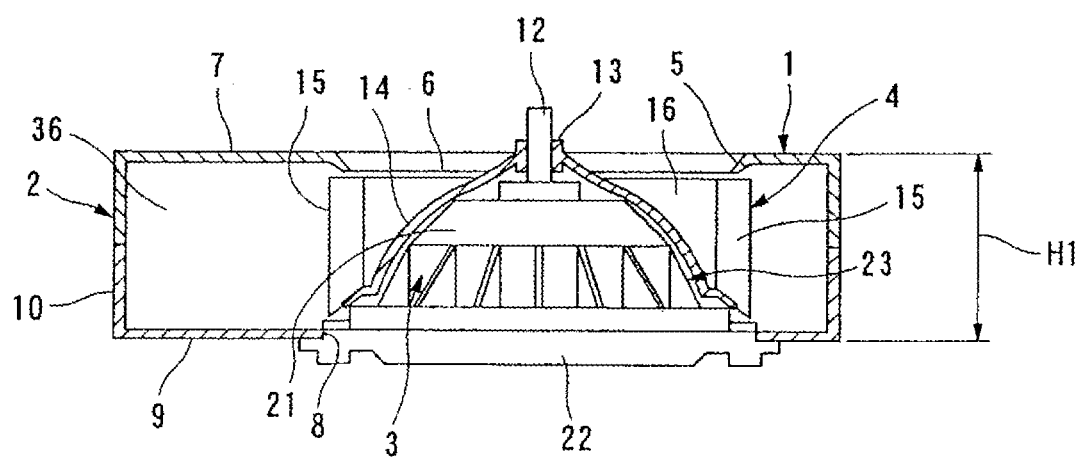

A blower unit 1 shown in FIG. 1 is situated in downstream of a battery for cooling the battery (not shown) and is used to inhales the heated air from the battery and to dissipate outside. Here, the blower unit 1 is designed for a small air volume, and includes a scroll-shaped blower case 2, a driving motor 3, and a multi-blade fan 4.

The blower case 2 is made of resin or the like, and includes: an upper side wall 7 having an opening 6 where a bell mouth 5 is formed integrated or separately; a lower side wall 9 that is arranged to face the upper side wall 7 at a predetermined interval and having therein a motor insertion hole 8 into which the driving motor 3 is installed; and an outer peripheral wall 10 situated to connect outer peripheral edges of the upper side wall 7 and the lower side wall 9 while providing a exhausting outlet 11 between them. The outer peripheral wall 10 starts from a winding start portion 10a, and is formed in spiral shape so that a distance from the center of the multi-blade fan 4 to the wall gradually increases along a circumferential direction of the multi-blade fan 4.

The multi-blade fan 4 itself is well known and, as shown in FIGS. 1, 2, 4 and 5, it includes: a boss part 13 fixed to a rotating shaft 12, described below, of the driving motor 3; a cone part 14 which is extending from the boss part 13; a plurality of blades 15 that are disposed in an upright position along the axial direction of the rotating shaft 12 and disposed along the circumferential direction of the outer peripheral edge of the cone part 14. In this configuration, the air flown in from an inlet 16 defined by the blades 15 and facing the cone part 14 is guided to the side of the blade 15 along the cone part 14 and passed through between the blade 15 and the blade 15.

In the driving motor 3, a motor main body 23 includes: the rotating shaft 12; a boss housing 17; a stator assembly 18 attached on the outer peripheral surface of the boss housing 17; a control circuit-board 19; a rotor assembly 20; a housing 21; and a flange 22, as shown in FIGS. 1, 2, 4 and 5.

Among these components, the rotating shaft 12 is formed in a generally circular rod shape. The rotating shaft 12 enables rotation of a rotor member, such as a multi-blade fan 4, which are attached to the upper end in the longitudinal direction of the rotating shaft 12. In addition, the rotating shaft 12 is rotatably supported by bearings 24 and 25 which are mounted to the cylindrical boss housing 17 that is extending from the housing 21 downward in the axial direction of the rotating shaft 12. The bearings 24 and 25 are ball bearings, for example, and this allows the bearing 25 to prevent rain water entering inside together with wind from entering the motor interior-space 50 described below.

Further, the stator assembly 18 is disposed on the outer peripheral surface of the boss housing 17, wherein the outer peripheral surface is extending downward in the axial direction of the rotating shaft 12. This stator assembly 18 consists of an iron core and an armature winding which are wound multiple times around the outer peripheral surface at the side of the core.

The rotor assembly 20 is attached to the rotating shaft 12 at an upper position in the axial direction of the rotating shaft 12 above the stator assembly 18. This rotor assembly 20 faces the stator assembly 18 in the radial direction of the rotating shaft 12, and it consists of a yoke 26 and magnets 27 which are positioned on the inner side surface of the yoke 25 to face the armature winding of the stator assembly 18. The magnets 27 are made of sintered ferrite, for example.

With this driving motor configuration 3, a rotating magnetic field resulting from the stator assembly 18 rotates the rotor assembly 20, which further makes the rotating shaft 12 rotate.

Further, the driving motor 3 includes a relatively thin-plate control circuit-board 19, on which electronic parts to control switching of a current fed to the armature winding of the stator assembly 18 through an electronic switch or the like are disposed. More specifically, the control circuit-board 19 includes a heat radiation part 29 such as a capacitor 28 and a transistor. In addition, in this embodiment, the control circuit-board 29 is situated in the lower end in the axial direction of the rotating shaft 12 than the stator assembly 18 and the rotor assembly 20, and the heat radiation part 29 such as capacitors 28 and transistors are also situated at the bottom surface side of the control circuit-board 19.

The housing 21 gradually increases its diameter from at around the rotating shaft 12 at the same time in the vicinity of the boss part 13 to the opposite end of the shaft 12 in the axial direction. The housing has opening at the opposite end of the boss part 13 to make an umbrella like structure as a whole, and it is cylindrical in that is has a first opening α at the multi-blade fan 4 side and a second opening β at the flange 22 side. Further, the housing 21 is made of a material which has excellent thermal conductivity, for example, metal such as aluminum.

The flange 22 can cover the second opening β which is the other opening made at the opposite end of the housing close to the boss part 13, and it has a recessed part 30 at the central region which is facing housing 21 side. The recessed part 30 preferably may have enough volume to contain small electronic parts such as capacitors 28 and transistors, size in the axial direction of the rotating shaft 12 being equal to or less than 10 mm, for example. Further, the flange 22 is made of a material, for example, resin such as polypropylene (PP) resin. Otherwise, the flange 22 could be made of a metal as the material.

Figure 2:
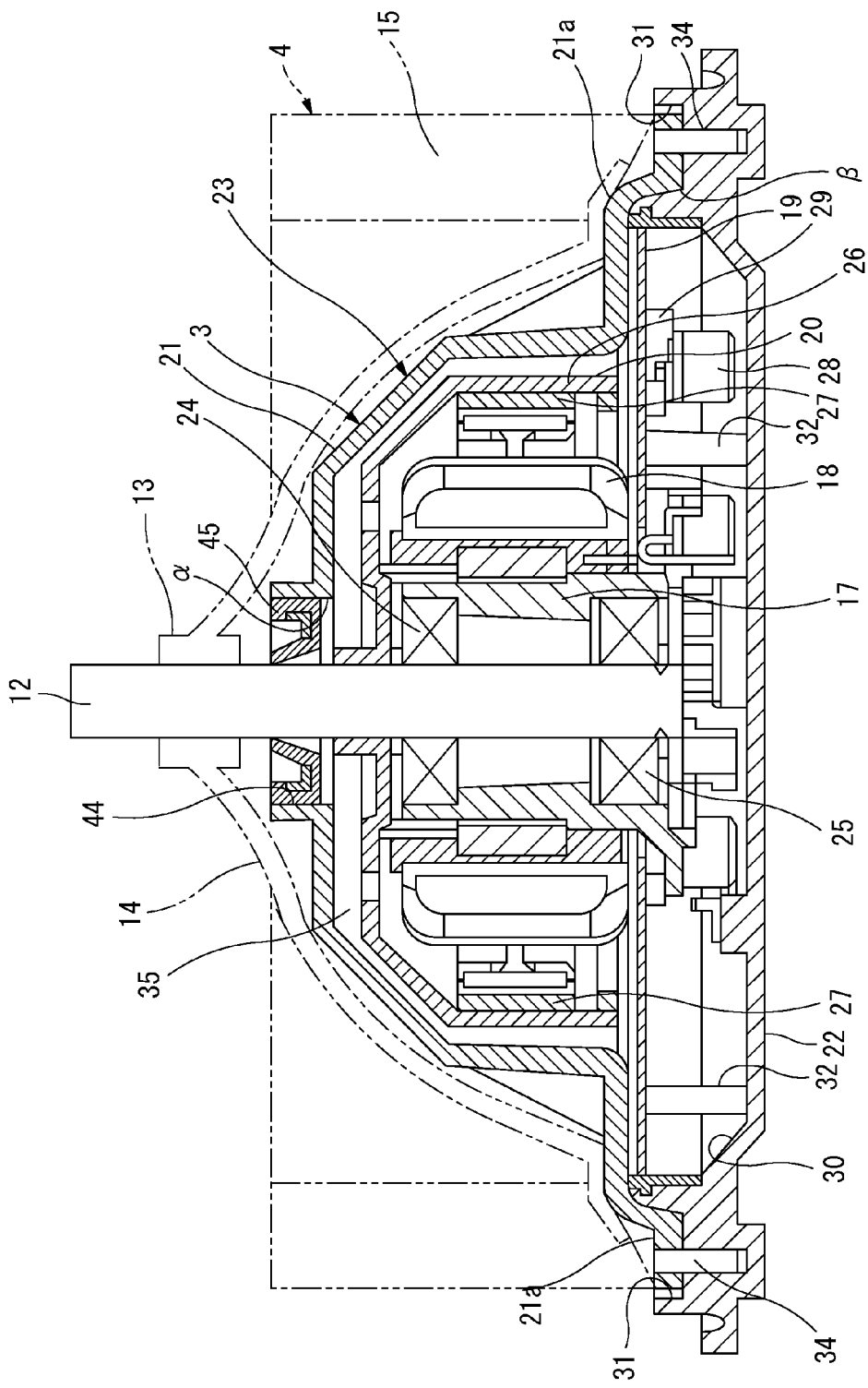
FIG. 2 is a cross section view showing the configuration of the above described driving motor for a small volume of air.
Figure 4:
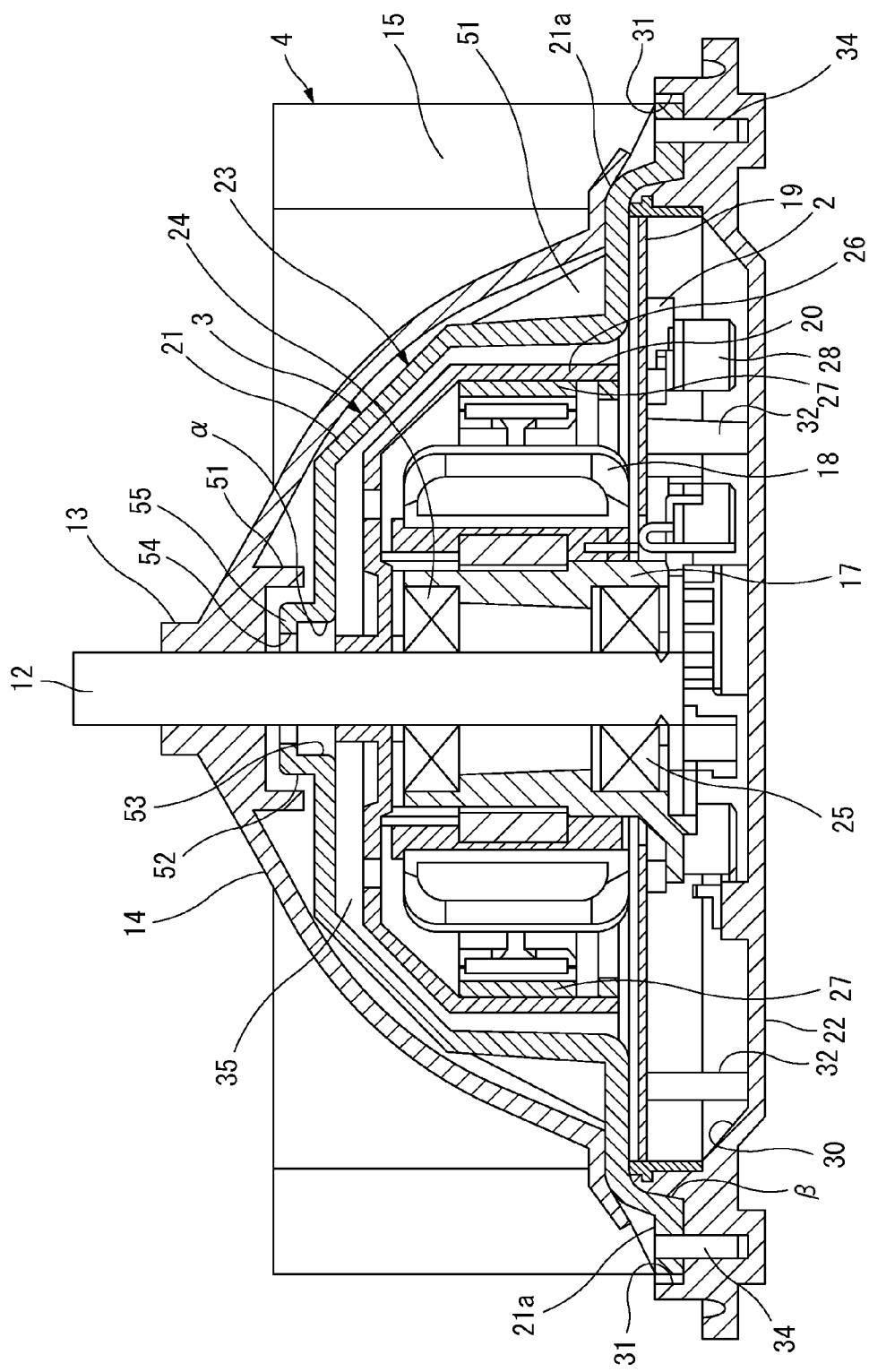
FIG. 4 is a cross section view showing a modification in which the need of the insertion of the elastic ring member to a cylindrical gap between a housing and a rotating shaft is eliminated, of the driving motor for a small volume of air shown in FIG. 2.
Figure 6:
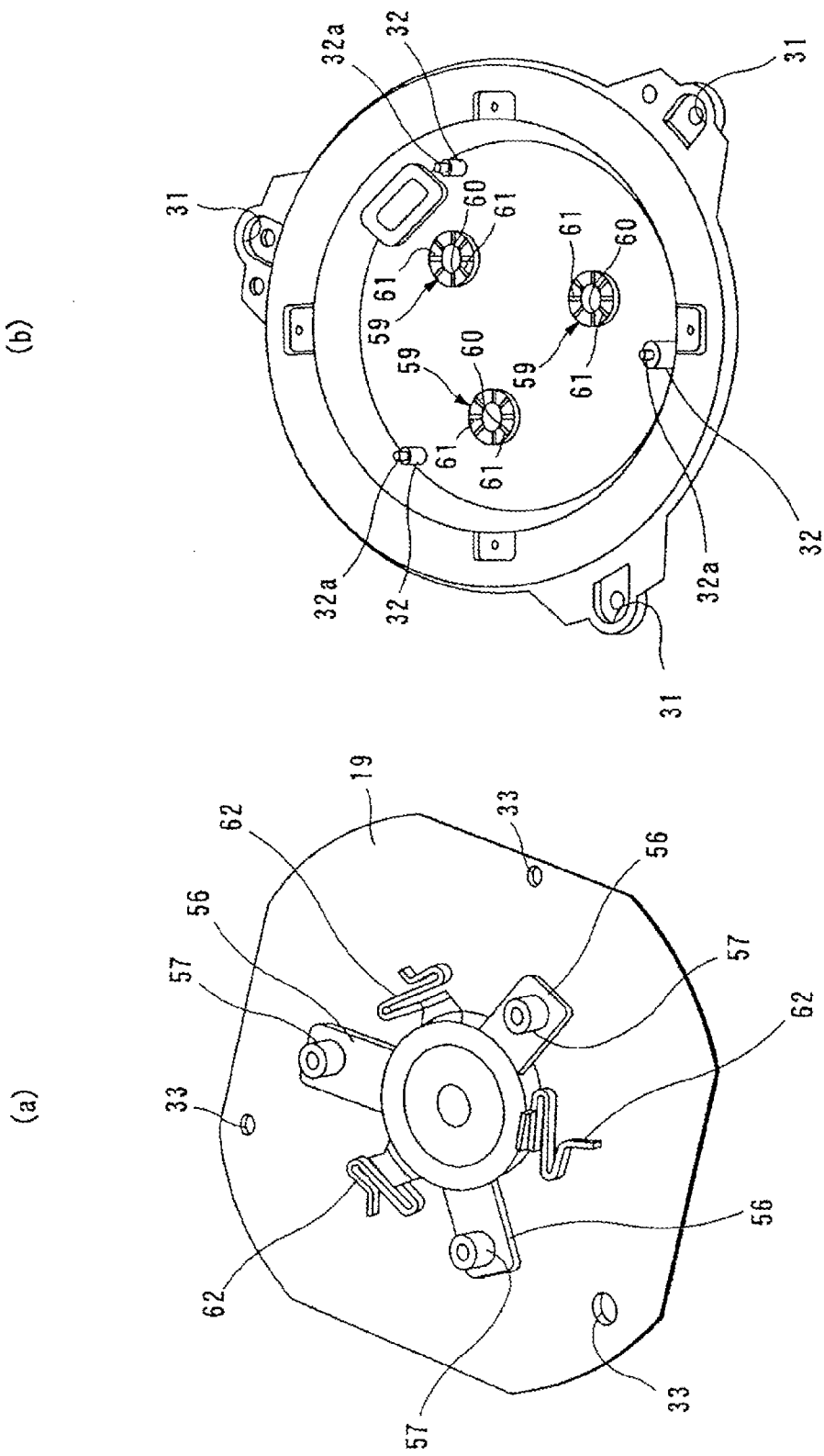
FIG. 6(a) is an explanatory view showing the configuration of a control circuit-board, in particular, the configuration of its bottom surface side, used for the driving motor having above described elastic mounting member.
FIG. 6(b) is an explanatory view showing the configuration of a flange used for the driving motor having above described elastic mounting member, in particular, the configuration of the top surface of the flange.

The flange of the driving motor 3 shown in FIGS. 2 and 4, as wall as shown in FIG. 6(b), has a concave part 31, at the peripheral edge that can meet at least the peripheral collar part 21a of the housing 21 is formed. A plurality of protrusions 32 are arranged on the bottom surface of the recessed part 30 of the flange 22, and an insertion part 32a is formed at the top of the protrusion 32, as shown in FIG. 6(b). The insertion part 32a of the protrusion 34 can be inserted into an insertion hole 33 formed in the back surface of the control circuit-board 18 shown in FIG. 6(a), accordingly, as shown in FIGS. 2 and 4, the insertion part 32a together with the protrusion 32 play a role of a stud to support the control circuit-board 19 from the flange 22 side.

Figure 5:
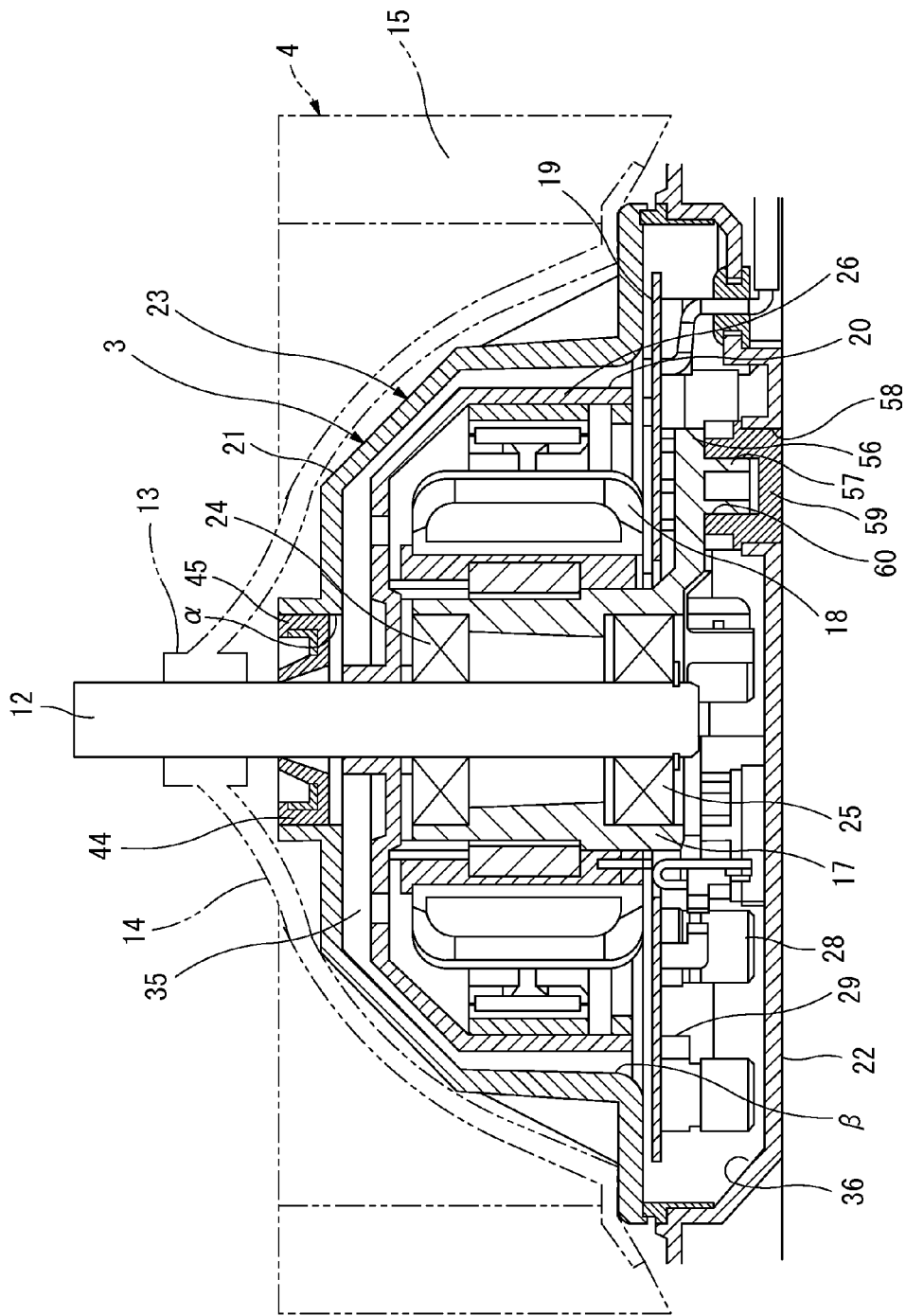
FIG. 5 is a cross section view showing the configuration having an elastic mounting member in the driving motor for a small volume of air of the present invention.

In the driving motor 3 of FIG. 5, the recessed part 30 and the protrusion 32 are not shown because the position of the cross section of the driving motor 3 is different from the driving motor 3, for example shown in FIGS. 2 and 4. Unlike this embodiment, the driving motor 3 shown in FIG. 5 may also has the recessed part 30 like that shown in shown in FIGS. 2 and 4, where the protrusion 32 are configured to be inserted into the insertion hole 33 of the control circuit-board 19 so that the control circuit-board 19 is secured from the flange 22 side.

Therefore, by securing the housing 21 and the flange 22 together making use of a bolt 34, a motor interior-space 35 is formed in the driving motor 3, as shown in FIGS. 2, 4, and 5. The motor interior-space 35 can hold the control circuit-board 19 and at least the end portion, the opposite side of the boss part 13, of the rotating shaft 12, and further holds the stator assembly 18 and the rotor assembly 20 in a space above the control circuit-board 19. Since the motor interior-space 35 has the recessed part 30 of the flange 22 to form a lower space below the control circuit-board 19, the heat radiation part 29 such as capacitors 28 and transistors are disposed.

Therefore, in the driving motor 3 for a small volume of air, all the parts can be disposed above the flange 22 unlike in the conventional driving motors where parts are disposed below the flange 22, accordingly, a lower case attached below the flange 22 in the conventional driving motors is eliminated. As a result, as shown in FIGS. 1(b), 2, 4, and 5, the lower surface of the driving motor 3 is formed in an generally flat, and since the driving motor 3 does not stick to outside, the duct can be avoided even when the blower unit 1 is arranged in the duct, and the driving motor 3 can be improved in terms of layout when the blower unit 1 is mounted on a vehicle, etc. In addition, as a result of the driving motor 3 configured in this way, the size H1 (shown in FIG. 1(b)) along the axial direction of the rotating shaft 12 of the driving motor 3 can be made relatively smaller by the thickness of the lower case of the conventional driving motors.

The housing 21 of the driving motor 3 for a small air volume, as shown in FIG. 1(b), has its outer surface exposed to an air duct 36 of the blower unit 1, and further, the housing 21 is made of a material which has excellent thermal conductivity, for example a metal such as aluminum, as described above. As a result, even if the control circuit-board 19 or the stator assembly 18 contained in the housing 21 generates heat, the outer surface (especially lateral outer surface) of the housing 21 is exposed to the air duct 36, and therefore, the heat generated from the control circuit-board 19 and the stator assembly 18 is transmitted to the highly thermal conductive housing 21 and is dissipated from the outer surface of the housing 21. This heat dissipation mechanism enables simple structure of the driving motor 3 without using a heat dissipation device such as a heat sink. At the same time, a manufacturing cost of the blower unit 1 can be relatively reduced due to the reduced number of parts, and the blower unit 1 can be further made smaller as well as the driving motor 3.

Figure 7:
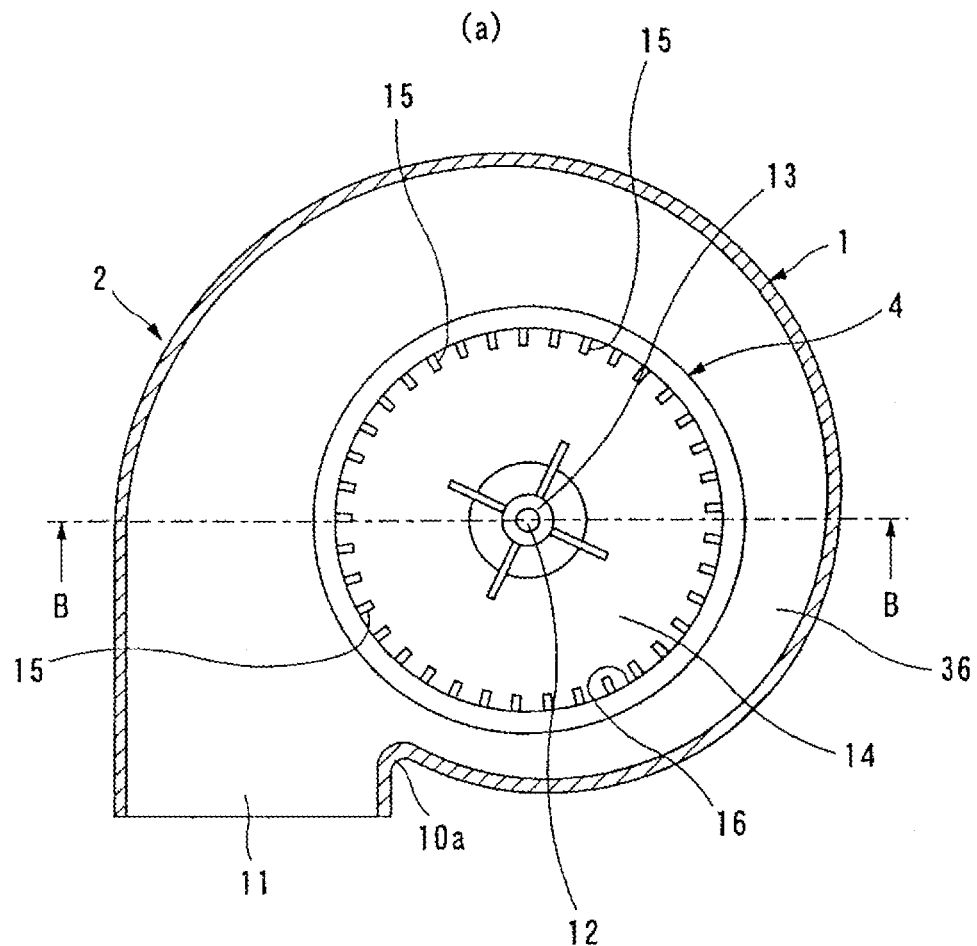
FIG. 7(a) is a diagram explaining a blower unit and a blower case which contains the blower unit, where a large capacity driving motor of the present invention is described.
FIG. 7(b) is a cross section view taken along B-B line of FIG. 7(a).
Figure 7:
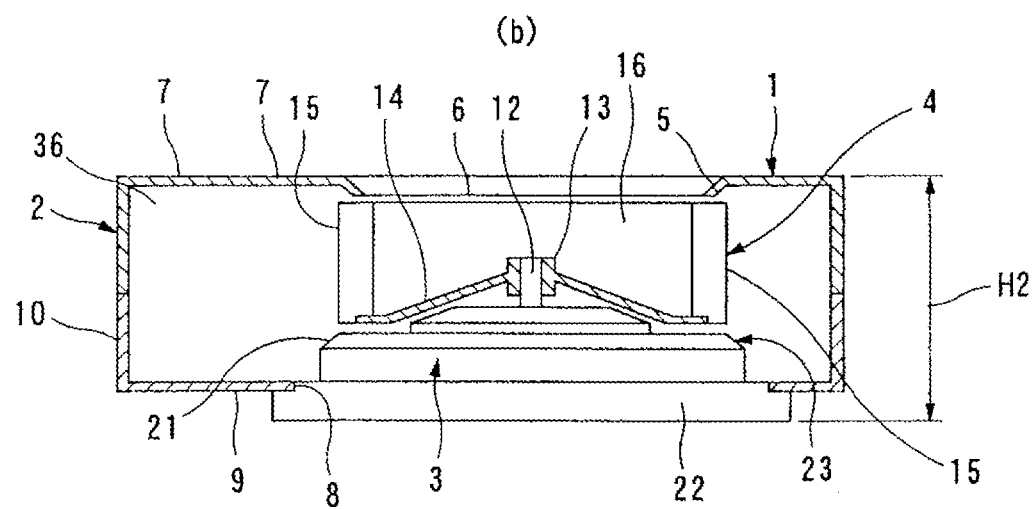

A blower unit 1 shown in FIG. 7 is situated in downstream of a battery for cooling the battery (not shown) and is used to inhales the heated air from the battery and to dissipate outside. Here, the blower unit 1 is designed for a large air volume, and includes a scroll-shaped blower case 2, a driving motor 3, and a multi-blade fan 4.

The blower case 2 is made of resin or the like, and includes: an upper side wall 7 having an opening 6 where a bell mouth 5 is formed integrated or separated; a lower side wall 9 that is arranged to face the upper side wall 7 at a predetermined interval and having therein a motor insertion hole 8 into which the driving motor 3 is installed; and an outer peripheral wall 10 situated to connect outer peripheral edges of the upper side wall 7 and the lower side wall 9 while providing a exhausting outlet 11 between them. The outer peripheral wall 10 starts from a winding start portion 10a, and is formed in spiral shape so that a distance from the center of the multi-blade fan 4 to the wall gradually increases along a circumferential direction of the multi-blade fan 4.

Figure 8:
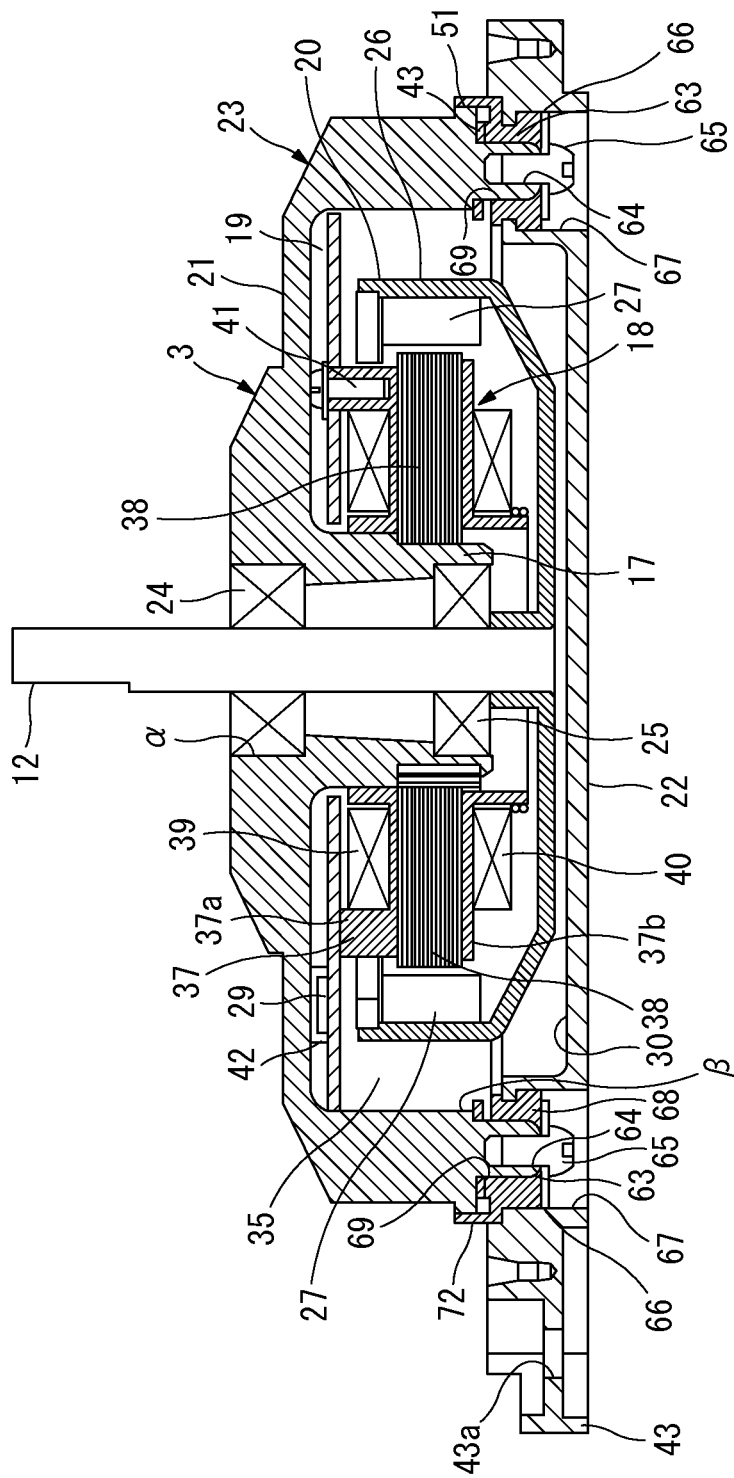
FIG. 8 is a cross section view showing the configuration of above described driving motor for a large volume of air.
Figure 14:
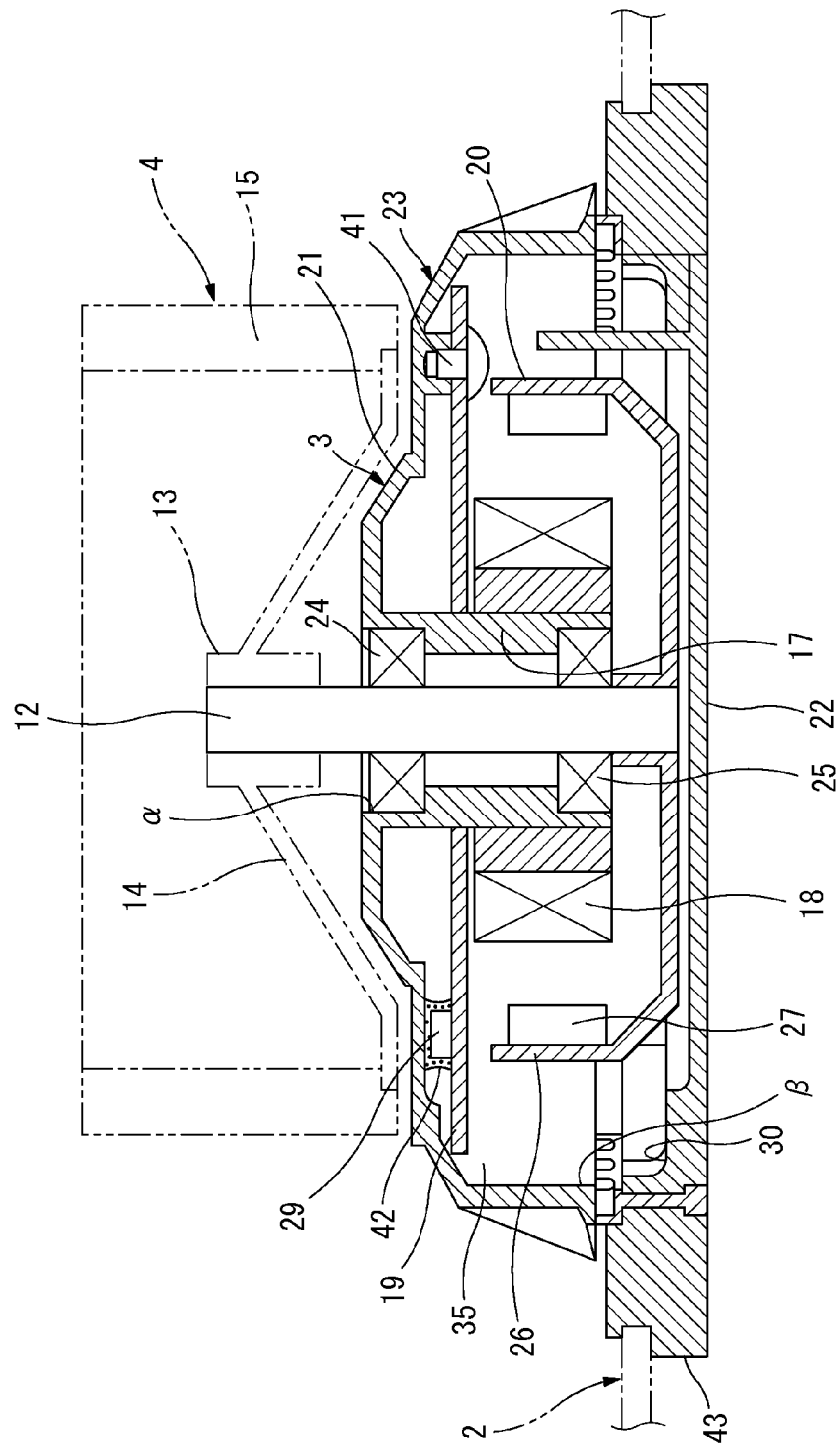
FIG. 14 is a cross section view showing the configuration of another modification of the peripheral edge elastic member of the driving motor for a small volume of air of the present invention.
Figure 15:
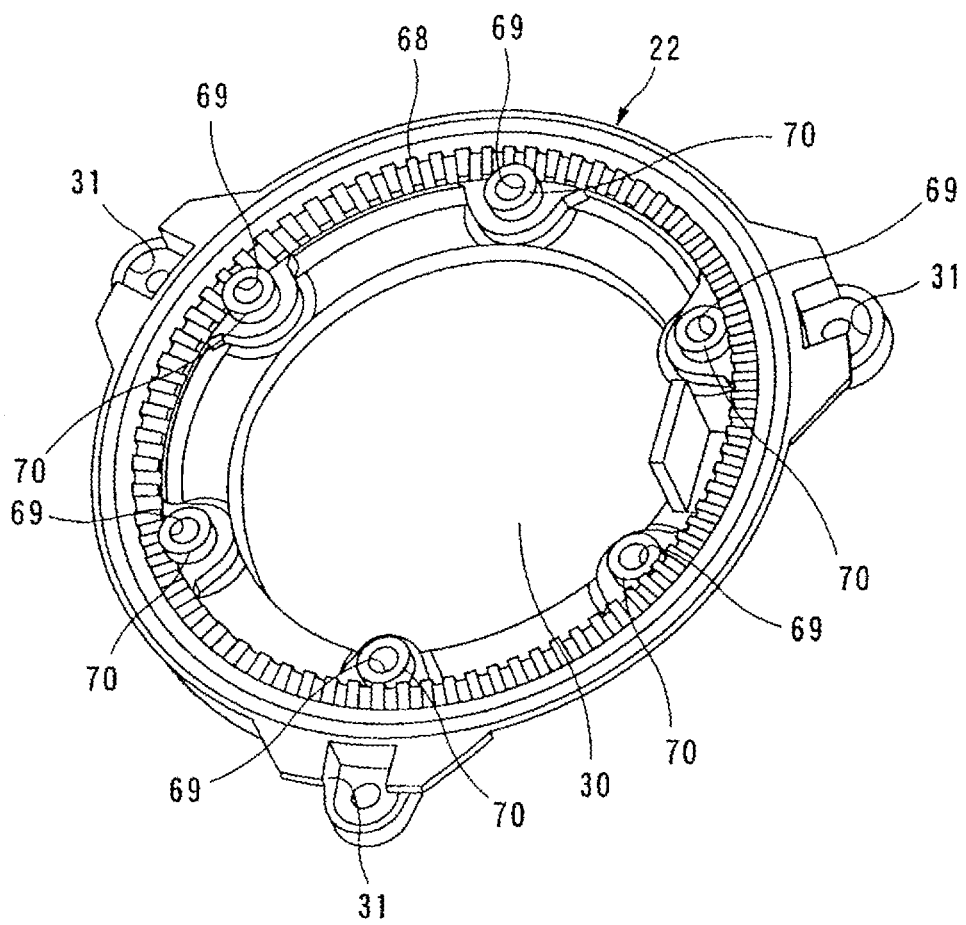
FIG. 15 is a plan view showing a state in which the flange of the driving motor having the modification of above described peripheral edge elastic member is viewed from a housing side.

The multi-blade fan 4 itself is well known and, as shown in FIGS. 7, 8 and 14, it includes: a boss part 13 fixed to a rotating shaft 12, described below, of the driving motor 3; a cone part 14 which is extending from the boss part 13; a plurality of blades 15 that are disposed in an upright position along the axial direction of the rotating shaft 12 and disposed along the circumferential direction of the outer peripheral edge of the cone part 14. In this configuration, the air flown in from an inlet 16 defined by the blades 15 and facing the cone part 14 is guided to the side of the blade 15 along the cone part 14 and passed through between the blade 15 and the blade 15.

In the driving motor 3, a motor main body 23 includes: the rotating shaft 12; a boss housing 17; a stator assembly 18 attached on the outer peripheral surface of the boss housing 17; a control circuit-board 19; a rotor assembly 20; a housing 21; and a flange 22, as shown in FIGS. 7, 8 and 14.

Among these components, the rotating shaft 12 is formed in a generally circular rod shape. The rotating shaft 12 enables rotation of a rotor member, such as a multi-blade fan 4, which are attached to the upper end in the longitudinal direction of the rotating shaft 12. In addition, the rotating shaft 12 is rotatably supported by bearings 24 and 25 which are mounted to the cylindrical boss housing 17 that is extending from the housing 21 downward in the axial direction of the rotating shaft 12. And the rotating shaft 12 is not connected to the flange. The bearings 24 and 25 are ball bearings, for example, and this allows the bearing 24 to prevent rain water entering inside together with wind from entering the motor interior-space 35 described below.

Further, the stator assembly 18 is disposed on the outer peripheral surface of the boss housing 17, wherein the outer peripheral surface is extending downward in the axial direction of the rotating shaft 12. This stator assembly 18, shown in FIG. 18, consists of a slot insulator 37, a core 38 and armature windings 38 and 39. The slot insulator 37 includes an upper side region 37a situated at an upper side (opposite side of the flange 22) in the axial direction of the rotating shaft 12, and a lower side region 37b situated at a lower side (at the side of the flange 22) in the axial direction of the rotating shaft 12. Between the upper side region 37a and the lower side region 37b of the slot insulator 37, a core part 38 made of iron for example is sandwiched. Each of armature windings 39 and 40 is wound multiple times around the upper side region 37a and the lower side region 37b of the slot insulator 37.

The rotor assembly 20 is attached to the rotating shaft 12 at a lower position in the axial direction of the rotating shaft 12 below the stator assembly 18. This rotor assembly 20 faces the stator assembly 18 in the radial direction of the rotating shaft 12, and it consists of a yoke 26 and magnets 27 which are positioned on the inner side surface of the yoke 26 to face the core part 28 of the stator assembly 18. The magnets 27 are made of sintered ferrite, for example.

With this driving motor configuration 3, a rotating magnetic field resulting from the stator assembly 18 rotates the rotor assembly 20, which further makes the rotating shaft 12 rotate.

Further, the driving motor 3 includes a control circuit-board 19, on which electronic parts to control switching of a current fed to the armature winding 39, 40 of the stator assembly 18 by means of an electronic switch or the like are disposed. The control circuit-board 19 includes a heat radiation part 29 such as capacitors and transistors. As shown in FIG. 8, the control circuit-board 19 is secured by a fixing member 41 such as a screw to the upper side region 37a in the slot insulator 37 of the stator assembly 18, and is positioned, higher than the stator assembly 18 and the rotor assembly 20, in the upper end area of the axial direction of the rotating shaft 12. Further, in FIG. 14, the control circuit-board 19 is secured by the fixing member 41 such as a screw onto the inner side surface of the housing 21 of the driving motor 3, and is positioned, higher than the stator assembly 18 and the rotor assembly 20, in the upper end area of the axial direction of the rotating shaft 12.

Silicon grease 42 is applied around the heat radiation part 29. As a result, heat generated from the heat radiation part 29 is transmitted to the housing 21, as described below, through the silicon grease 42 and is dissipated outside from the housing 21.

The housing 21 as shown in FIG. 8 and FIG. 14 gradually increases its diameter from at around the rotating shaft 12 at the same time in the vicinity of the boss part 13 to the opposite end of the shaft 12 in the axial direction. The housing has opening at the opposite end of the boss part 13 to make an umbrella like structure as a whole, and it is cylindrical in that is has a first opening α at the multi-blade fan 4 side and a second opening β at the flange 22 side. Further, the housing 21 is made of a material which has excellent thermal conductivity, for example, metal such as aluminum. In this embodiment, the housing 21 includes a boss housing 17 which extend downward from near the first opening α of the inner surface along the axial direction of the rotating shaft.

The flange 22 which can cover the second opening β of the housing 21 is made of polypropylene (PP) resin, etc. and thus, as shown in FIGS. 8 and 14, it has a recessed part 30 at the central region which is facing housing 21 side. In fact, the recessed part 30 is a very small space, having depth of only 10 mm or less, for example. Further, the flange 22 may be made of iron, for example. In FIG. 8, the flange 22 has an extension 43 extending outward from the flange 22 for securing the driving motor 3 to another device like a blower case 2 of a blower unit 1 of a vehicle air conditioner. Each extension 43 has a through-hole 43a for this purpose. It is noted that, although not shown, a through-hole may be formed similarly in the extension 43 of the flange 22 of the driving motor 3 shown in FIG. 14 to be used for securing the driving motor 3 to the blower case 2 of the blower unit 1.

Therefore, by securing the housing 21 and the flange 22 together making use of a bolt 34, a motor interior-space 35 is formed in the driving motor 3, as shown in FIGS. 8 and 14. The motor interior-space 35 can hold the control circuit-board 19 and at least the end portion, the opposite side of the boss part 13, of the rotating shaft 12, and further holds the stator assembly 18 and the rotor assembly 20 in a space below the control circuit-board 19.

As a result, in case of the driving motor 3 for a large volume of air, similar mechanism to that of driving motor 3 for a small volume of air works and similar results, as described earlier, are obtained. Therefore, in the driving motor 3 for a small volume of air, all the parts can be disposed above the flange 22 unlike in the conventional driving motors where parts are disposed below the flange 22, accordingly, a lower case attached below the flange 22 in the conventional driving motors is eliminated. As a result, as shown in FIGS. 7(b), 8, and 14, the lower surface of the driving motor 3 is formed in an generally flat, and since the driving motor 3 does not stick to outside, the duct can be avoided even when the blower unit 1 is arranged in the duct, and the driving motor 3 can be improved in terms of layout when the blower unit 1 is mounted on a vehicle, etc. In addition, as a result of the driving motor 3 configured in this way, the size H2 (shown in FIG. 7(b)) along the axial direction of the rotating shaft 12 of the driving motor 3 can be made relatively smaller by the thickness of the lower case of the conventional driving motors.

The housing 21 of the driving motor 3 for a large air volume, as shown in FIG. 7(b), has its outer surface exposed to an air duct 36 of the blower unit 1, and further, the housing 21 is made of a material which has excellent thermal conductivity, for example a metal such as aluminum, as described above. As a result, even if the control circuit-board 19 or the stator assembly 18 contained in the housing 21 generates heat, the outer surface (especially lateral outer surface) of the housing 21 is exposed to the air duct 36, and therefore, the heat generated from the control circuit-board 19 and the stator assembly 18 is transmitted to the highly thermal conductive housing 21 and is dissipated from the outer surface of the housing 21. This heat dissipation mechanism enables simple structure of the driving motor 3 without using a heat dissipation device such as a heat sink. At the same time, a manufacturing cost of the blower unit 1 can be relatively reduced due to the reduced number of parts, and the blower unit 1 can be further made smaller as well as the driving motor 3.

It is noted that in the first opening α (multi-blade fan side) of the housing 21 of the driving motor 3 for a small volume of air shown in FIGS. 2 and 5, an cylindrical gap 44 is created between the housing 21 and the lateral periphery surface of the rotating shaft 12, and it is extending along the axial direction of the rotating shaft 12. And an elastic ring member 45 is inserted in the cylindrical gap 44.

Figure 3:
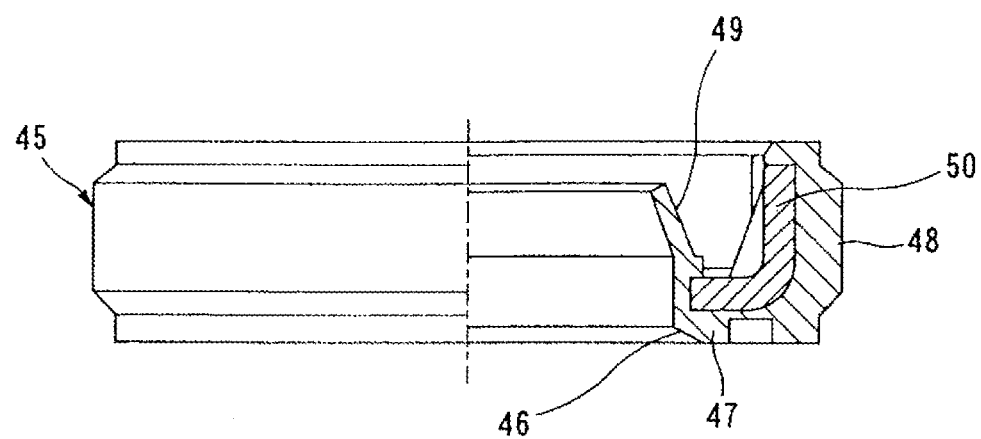
FIG. 3 is a half-cross section view showing the structure of an elastic ring member of the above described driving motor for a small volume of air.

This elastic ring member 45 is formed of a material such as nitride rubber (NBR) and has elasticity. As shown in FIG. 3, the elastic ring member 45 includes: a bottom wall part 47 of an annular plate having a circular hole 46 at the center; an outer peripheral wall part 48 which is extending from the outer peripheral edge of the bottom wall part 47 in the axial direction of the circular hole 46, and it contacts the inner peripheral surface of the flange 22 when it is inserted in the cylindrical gap 44; and an inner peripheral wall part 49 thickness of which gradually reduces from the inner peripheral edge of the bottom wall part 48 along the axial direction of the circular hole 46, at the same time the wall part 49 being extending in an oblique direction, and oblique extension contacts circumference edge surface of the rotating shaft 12 when it is inserted in the cylindrical gap 44. In this embodiment of FIG. 3 the elastic ring member 45 has a built-in sheet spring 50 which is inserted between the outer peripheral wall part 48 and the bottom wall part 47.

As a result, the elastic ring member 45 is inserted air-tightly between the housing 21 and the rotating shaft 12 at the same time allowing rotation of the rotating shaft 12. This prevents water from entering the motor interior-space 35 from outside the housing 21 through the gap between the housing 21 and the rotating shaft 12, and it becomes possible to suppress the magnetic vibration and the rotation vibration of the rotating shaft 12 from being transmitted to the housing 21.

The elastic ring member 45 which is applied to the driving motor 3 for a small volume of air has been illustrated; however, the elastic ring member 45 can also be applied to the driving motor 3 for a large volume of air shown in FIGS. 8 and 14. That is, in case of the driving motor 3 for a large volume of air shown in FIGS. 8 and 14, when the cylindrical gap is arranged between the housing 21 and the lateral peripheral surface of the rotating shaft 12 in the first opening α, which is the multi-blade fan 4 side of the shaft, then it is possible to provide the elastic ring member 45 in the cylindrical gap in the same way with in case of the driving motor 3 for a small volume of air.

The driving motor 3 for a small volume of air may be modified to have no elastic ring member 45 by means of assembling the housing 21 and the cone part 14 which contains a rotor member like a multi-blade fan 4. That is, the cone part 14 has a cylindrical part 51 which, in the outer region surrounding the boss, extends from the vicinity of the boss toward the motor interior-space 35 (toward opposite end in the axial direction of the rotating shaft 12) along the rotating shaft 12. The housing 21 at the same time has a cylindrical part 52 extending toward the boss part 13 (opposite end in the axial direction of the rotating shaft 12) along the rotating shaft 12. The outer radius of the cylindrical part 52 is relatively smaller than the inner radial size of the cylindrical part 51. On the other hand, the inner radial is large enough to be able to create the cylindrical gap 53 between the housing 21 and the rotating shaft 12. The boss side end of the cylindrical part 52 has an insertion hole 54 through which the rotating shaft 12 can be inserted. And from the peripheral edge of the insertion hole 54, the flange 55 is extending toward the rotating shaft 12 in the radial direction of the rotating shaft 12.

As a result, when assembling the rotor member such as the multi-blade fan 4 and the driving motor 3, the cylindrical part 52 of the housing 21 is housed in the cylindrical part 51 of the cone part 14, and the gap between the cylindrical part 51 and the cylindrical part 52 is divided into a complex space (labyrinth space) to form a portion extending along the axial direction of the rotating shaft 12, and another portion, above the previous portion, extending along the radial direction of the rotating shaft 12. Therefore, it is possible to stop the external water from entering the motor interior-space 35 from the insertion hole 54 and the cylindrical gap 53, and it is also possible to eliminate a need of the elastic ring member 45.

It is noted that the driving motor 3 for a large volume of air shown in FIGS. 8 and 14 can be also modified, not shown, similar to above description, to have a construction, where the cylindrical part 52 of the housing 21 is housed in the cylindrical part 51 of the cone part 14, and the gap between the cylindrical part 51 and the cylindrical part 52 is divided into a complex space (labyrinth space) to form a portion extending along the axial direction of the rotating shaft 12, and another portion, above the previous portion, extending toward the radial direction of the rotating shaft 12. Then it is also possible to eliminate the need of the elastic ring member 45.

Moreover, in the driving motor 3 for a small volume of air shown in FIGS. 2, 4, and 5, the rotating shaft 12, the boss housing 17, the rotor assembly 20, and the bearings 24 and 25 are components of vibration body, and these rotating shaft 12, the boss housing 17, the rotor assembly 20, and the bearings 24 and 25 are integrally assembled, as shown in FIG. 5. As shown in FIGS. 5 and 6(a), in a lower region of the boss housing 17, there are disposed a plurality of support arm 56 which is radially extending toward the outside in the radial direction of the rotating shaft 12. At the distal end of the support arm 56, a protrusion 57 is disposed and is extending downward. When the flange 22 and the housing 21 are assembled, a notch 58 is formed in the flange 22 as shown in FIGS. 5 and 6(b) at a position corresponding to the protrusion 57 of the support arm 56. The elastic mounting member 59 is then attached to the notch 58. In addition, an insertion hole 60 through which the protrusion 57 of the support arm 56 can be inserted is formed in the elastic mounting member 59, where liner grooves 61 extends radially from the insertion hole 60.

As a result, vibration from the rotating shaft 12, the boss housing 17, the rotor assembly 20, and the bearings 24 and 25 which are the components of vibration body the driving motor 3, is transmitted to the flange 22 through the elastic mounting member 59, and thus, the vibration is attenuated by the elastic mounting member 59, and consequently, amount of vibration to the flange 22 can be reduced.

Additionally, as shown in FIG. 6(a), a connecting device 62 having a spring function is disposed in the back surface side of the control circuit-board 19. The connecting device 62 secures an electric conduction between the control circuit-board 19 and the stator assembly 18, as well as attenuates the transmission of the magnetic vibration or the rotation vibration from a rotator including the rotating shaft 12 to the control circuit-board 19.

It is noted that, not shown, the driving motor 3 for a large volume of air shown in FIGS. 8 and 14 can also reduce the vibration, similar to above, by means of transmitting vibration through the elastic mounting member 59, where vibration comes from the driving motor vibration body of rotating shaft 12, the boss housing 17, the rotor assembly 20, and the bearings 24 and 25. Vibration of the flange 22 can be greatly attenuated by this structure.

Figure 11:
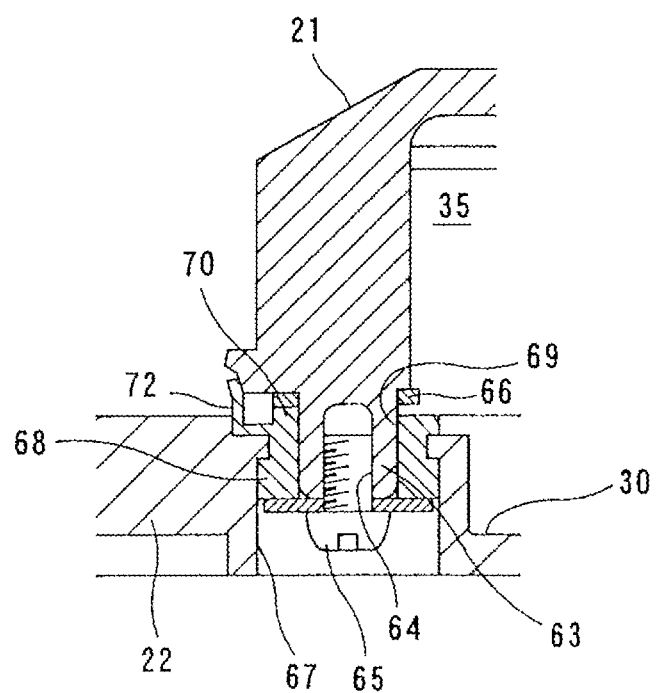
FIG. 11 is a cross section view showing a state in which the intervening elastic member, the peripheral edge elastic member, and the receiving part of the above-described flange are combined.

On the other hand, as shown in FIGS. 8 and 11, the housing 21 of the driving motor 3 for a large volume of air has a flange facing surface which is facing the flange 22 in the peripheral of the opening formed at the flange 22 side of the shaft, and a plurality of protrusions 63 is extending from the flange facing surface in the axial direction of the rotating shaft 12 toward the flange 22 At the top of the extended part of each protrusion 63, there opened a screw hole 64 extending along the axial direction of the rotating shaft 12, and a screw 65 is to be inserted thereto. Moreover, in the outer peripheral surface of the protrusion 63, ring washer 66 is disposed, as shown in FIGS. 8 and 11.

Figure 9:
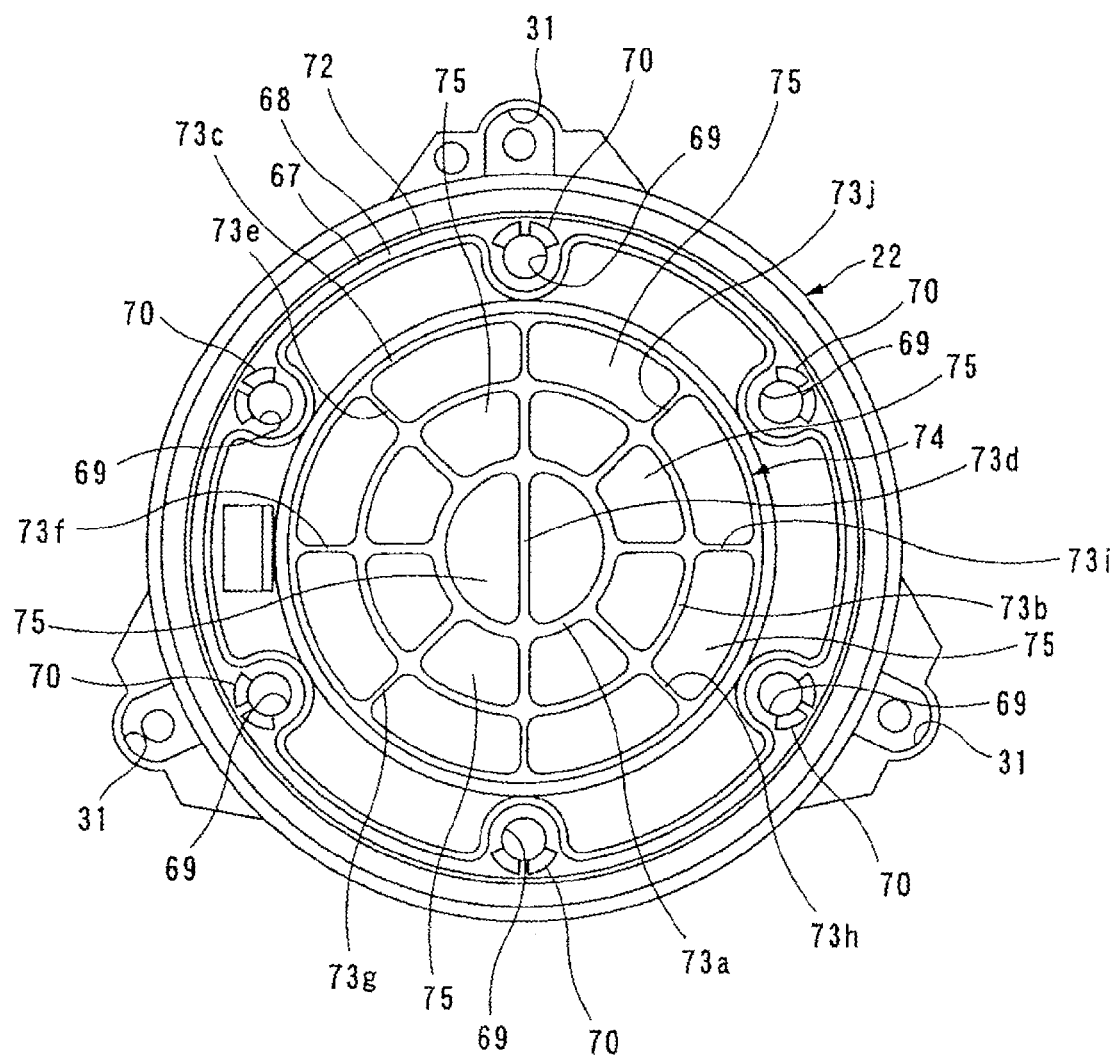
FIG. 9 is a plan view showing a state in which a flange of above described driving motor for a large volume of air is viewed from a housing side.

As shown in FIGS. 8, 9, and 11, in the driving motor 3 for a large volume of air the flange 22 outer area which is facing the flange facing surface of the housing 21 has notches 67 which are extending in radial direction toward outer edge, the rotating shaft 12 being the center point. The flange 22 is attached while an intervening elastic member 68 is pressed into the notch 67.

Figure 10:
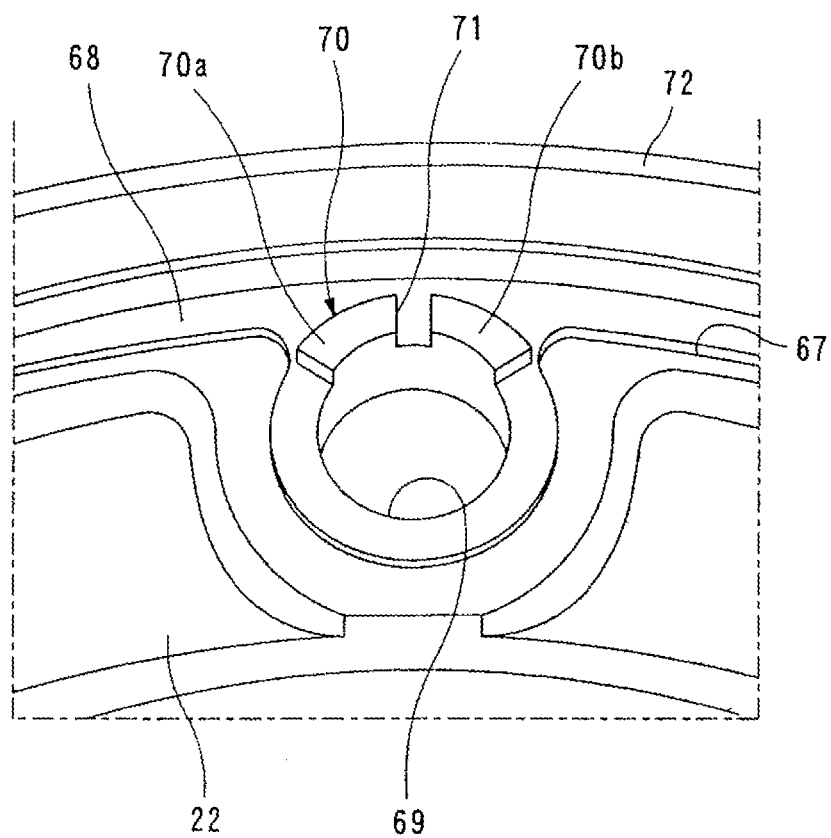
FIG. 10 is an enlarged view showing the configuration of an intervening elastic member, a peripheral edge elastic member, and a receiving part of above described flange.

As shown in FIGS. 8 through 11, the intervening elastic member 68 includes a through-hole 69 through which the protrusion 63 of the housing 21 can be inserted. At the same time, as shown in FIGS. 9 and 10, in the outer peripheral area of the flange 22 a receiving part 70 is extending along the circumferential direction as the through-hole center to be central point, and it is also protruding in the axial direction of the through-hole 69. The receiving part 70 has a circular arc shape spreading less than half the circle (fan shape), and can slightly adhere to both sides of the washer 66 through which the screw 65 is inserted. More in detail, in this embodiment, as shown in FIG. 10, the receiving part 70 is divided into a plurality of regions 70a and 70b by a slit 71 which is extending in the radial direction of the through-hole 69. It is noted that the receiving part 70 may be configured to tightly adhere to the flange facing surface of the housing 21 without making use of the washer 66, or the receiving part 70 may be of one single unit rather than being divided into a plurality of regions by the slit 71.

Figure 12:
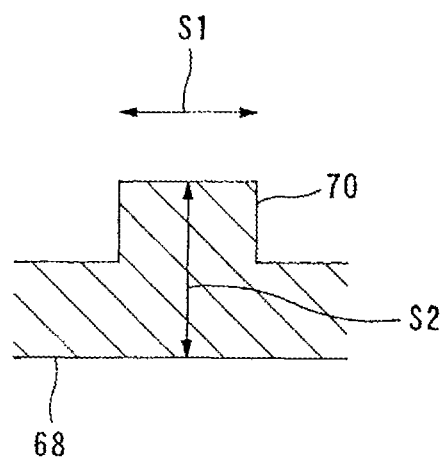
FIG. 12 is an explanatory view explaining a spring constant of above described intervening elastic member.

The intervening elastic member 68 is made of materials which are generally used as an elastic member for a vehicle air-conditioner, such as ethylene-propylene-diene rubber (EPDM), butyl rubber (IIR), and elastomer. In the receiving part 70 of the intervening elastic member 68, as shown in FIG. 12, a numerical value S1 of a spring constant in the rotating direction of the rotating shaft 12 (radial direction of the rotating shaft 12) is smaller than a numerical value S2 of a spring constant in the axial direction of the rotating shaft 12.

Therefore, as shown in FIGS. 8, 9, and 11, the protrusion 63 arranged in the housing 21 and the receiving part 70 of the intervening elastic member 68 arranged in the flange 22 are respectively arranged along the circumferential direction around the rotating shaft 12 so as to make intervals between the protrusions 63, and intervals between the receiving parts 70 generally equal. As a result, the housing 21, as well as the motor main body 23, are supported from below by the receiving part 70 of the intervening elastic member 68. It is noted that in FIG. 9, the receiving parts 70 are arranged at six locations, however, three receiving parts 70 arranged in the flange 22 around the rotating shaft can support the motor main body 23. Therefore, number of combinations of the protrusions 63 and the receiving parts 70 can be appropriately selected considering a cost of individual products and a vibration attenuation effect, for example.

As shown in FIG. 11, since the housing 21 and the flange 22 are connected in the process of mounting the elastic intervening member 68 in the notch 67 of the flange 22, inserting the protrusion 63 into the through-hole 69 of the intervening member 68, and inserting the screw 65 with the washer 66 interposed into the screw hole 64 of the protrusions 63, the housing 21 and the flange 22 are not directly connected because the intervening elastic member 68 made of the above-described material interposed. Moreover, the intervening elastic member 68 abuts the housing receiving part 70 positioned at the outer peripheral side of the flange 22. In addition, as described above, the receiving part 70 of the intervening elastic member 68 has the spring constant S2 of the axial direction is larger than the spring constant S1 in the rotating direction of the rotating shaft 12 (radial direction of the rotating shaft 12). In addition, vibration bodies such as the rotor assembly 20 and the rotating shaft 12 are connected only to the housing 21 not connected to the flange 22.

In the driving motor for a large volume of air, while the rotating shaft 12 or the rotor assembly 20 makes one revolution, the magnetic fields generated by the stator assembly 18 are switched several times (for example, 12 times) to keep the rotation force of the rotor assembly 20. Every switching of magnetic field generates force to rotate the rotor assembly as well as generate magnetic vibration in the radial direction of the rotating shaft 12. On the other hand, a precession is generated when rotating shaft of the multi-blade fan 4 or the rotor assembly 20 deviates from the center of the rotation, and every one revolution generates one (one cycle of) precession. Thus, the magnetic vibrations are generated more often than the precession. For this reason, in order to reduce the magnetic vibration, the spring constant S1 in the rotating direction is made smaller than the spring constant S2 in the axial direction of the rotating shaft 12. Thus, it is possible to effectively reduce the vibration.

As a result, transmission of vibration from the housing 21 to the flange 22 is attenuated by the intervening elastic member 68 interposed between the housing 21 and the flange 22, and therefore, the amount of the transmission of rotational vibration and magnetic vibration from the housing 21 to the flange 22 is relatively reduced. Consequently, vibration arising from the flange 22 as well as the blower case 2 which is connected to the flange 22 can be greatly reduced. This decreases the noise of the driving motor 3 and the blower unit 1, and thus, it is possible to provide a highly quiet blower unit 1. Further, the intervening elastic member 68 contact the housing 21 only at relatively small contact area of the receiving part 70, which results in further reduction of the vibration transmission from the housing 21 to the flange 22.

Figure 13:
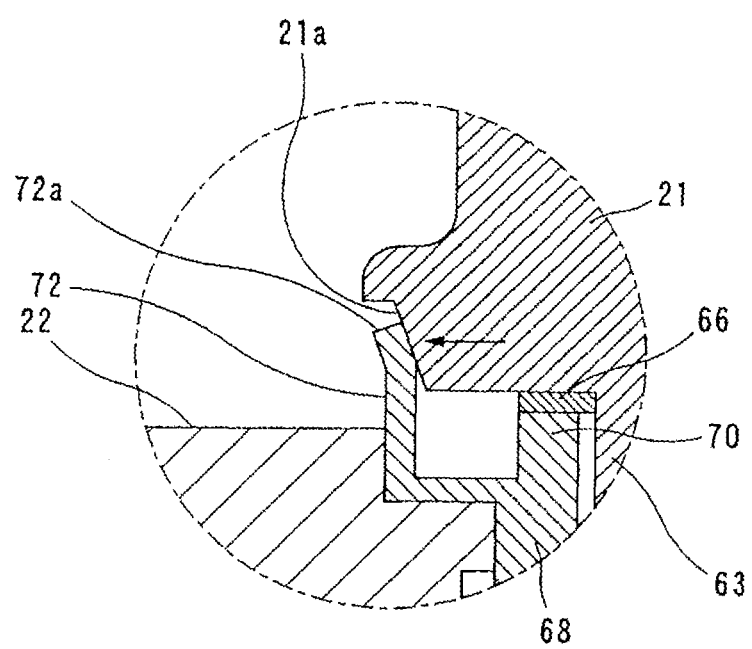
FIG. 13 is a further enlarged view of FIG. 11 to show the configuration of the peripheral edge elastic member.

On the other hand, in this embodiment, the intervening elastic member 68 and the peripheral edge elastic member 72 are basically one body as shown in FIGS. 8, 11, and 13. As shown in FIG. 9, the peripheral edge elastic member 72 is formed in outer circumference of the flange 22 than the receiving part 70 of the intervening elastic member 68, and as shown in FIG. 13, it extends toward the housing 21.

As shown in FIG. 13, the top of the extension of the peripheral edge elastic member 72 is designed to abut the housing outer circumferential surface 21a which is in the vicinity of flange side opening, and when at a time of abutting the top of the extension receives the pressure from the housing 21 to be compressed to deform in radial direction of the rotating shaft 12 toward outer edge of the flange 22. On the other hand, as shown in FIG. 13, the top 72a of the extension of the peripheral edge elastic member 72 does not abut the housing 21 in the axial direction of the rotating shaft 12. As a result, the top 72a the top 72a of the extension is not compressed by the pressing force from the housing 21 in the axial direction of the rotating shaft 12.

Therefore, even if the peripheral edge elastic member 72 is disposed, vibrations is not transmitted from the housing 21 to the flange 22 through the peripheral edge elastic member 72, and thus, it is possible to suppress the diffusion of the noise generated in the motor interior-space. Furthermore, since the contacting area between the housing 21 and the flange 22 is sealed by the peripheral edge elastic member 72, it is possible to prevent rain water flowing together with wind from entering through the contact area between the housing 21 and the flange 22.

Moreover, as shown in FIG. 9, the flange 22 includes a rib 74 that is constructed of a plurality of liner protrusions 73a to 73j. In this embodiment, the rib 74 expresses a pattern that resembles turtle back pattern, which is a combination of; an innermost circular protrusion 73a, the center of which is facing the end of the rotating shaft 12; a circular protrusion 73b being located outside the circular protrusion 73a and forming a concentric circle with the circular protrusion 73a; a circular protrusion 73c being located outside the circular protrusion 73b and forming a concentric circle with the circular protrusions 73a and 73b; a linear protrusion 73d extending from a certain point of the circular protrusion 73c passing by way of the center point to another point of the circular protrusion 73c; and fin protrusions 73e, 73f, 73g, 73h, 73i, and 73j which are having the common center point and radially extending in equal radial intervals in the area surrounded by the circular protrusion 73b and the circular protrusion 73c. It is noted that the pattern of the rib 74 is not limited to the pattern shown in FIG. 9, and any pattern may be utilized to minimize particular vibration characteristic of the flange 22. For example, a honeycomb pattern formed by combining a plurality of hexagonal patterns may be acceptable.

Further, in each cell of the flange 22 partitioned by the circular protrusions 73a to 73c and the linear protrusions 73d to 73j, plate-shaped elastic member 75 made of material such as elastomer are filled as a vibration-proof material. Process of filling the plate-shaped elastic member 75 into the cells of the flange 22 includes attaching the member to the flange 22 by using adhesive or an adhesive seal, and filling elastomer by using injection molding to the cells of the injection-molded flange 22 (two-phase injection). Other processes may be appropriately selected depending on the environment where the driving motor 3 is used or the production cost.

By disposing the vertical ribs 74, stiffness of the flange 22 is relatively improved, and due to the fact that the plate-shaped elastic member 75 is filled into the flange cells surrounded by the circular protrusions 73a to 73c and the liner protrusions 73d to 73j, resonance noise due to magnetic vibration which is generated by flange distortion is greatly reduced.

FIG. 14 shows the driving motor 3 having a modification of the intervening elastic member 68 inserted between the housing 21 and the flange 22. The intervening elastic member 68 of the driving motor 3 includes circular belt of plurality of grooves which are disposed in radial direction. Each groove may not extend to outer edge of the annular intervening elastic member 68. As a result, since the housing 21 keep clearance from the flange 32, vibration absorption effect of the intervening elastic member 68 is increased. Consequently, it is possible to realize the lower noise driving motor 3. Here as shown in FIG. 14, the receiving part 70 of the intervening elastic member 68 is of cylindrical structure with a through-hole 69 in it.

It is noted that so far the intervening elastic member 68 and its modification, the peripheral edge elastic member 72, and the plate-shaped elastic member 75 are shown and described as being used for the driving motor 3 for a large volume of air. Naturally, the driving motor 3 for a small volume of air shown in FIGS. 2, 4, and 5 may be configured to use the intervening elastic member 68 or its modification, the peripheral edge elastic member 72, and the plate-shaped elastic member 75, as described above.

Figure 16:
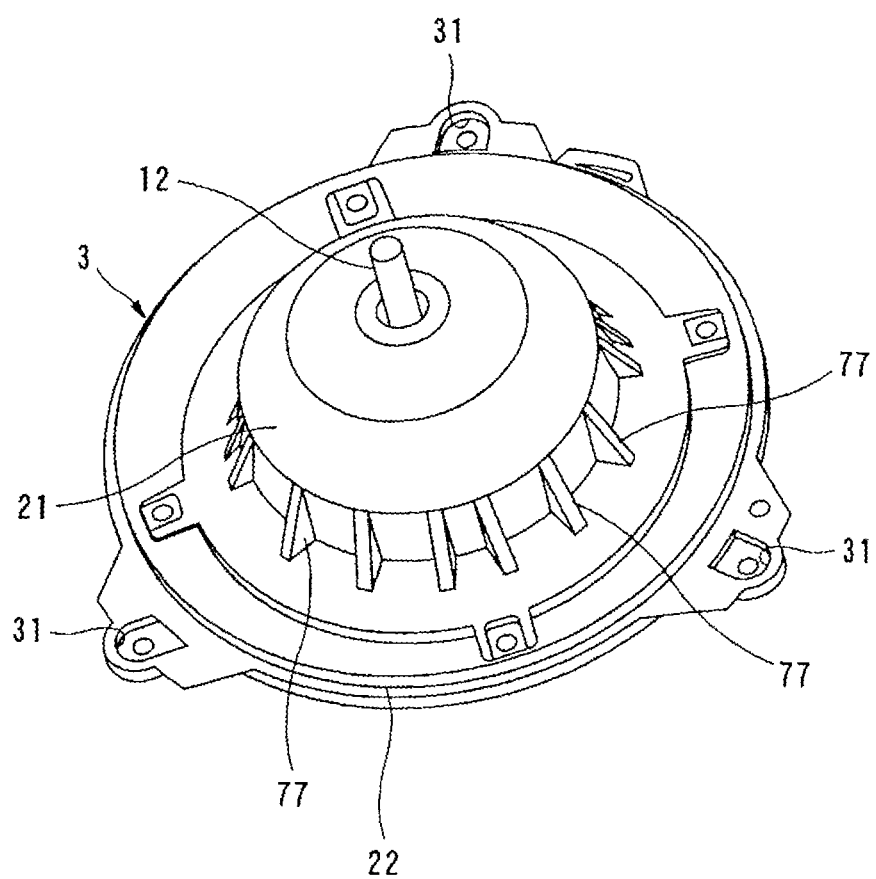
FIG. 16 is an explanatory view showing the configuration of a heat dissipation accelerator arranged in the housing of the driving motor.
Figure 17:
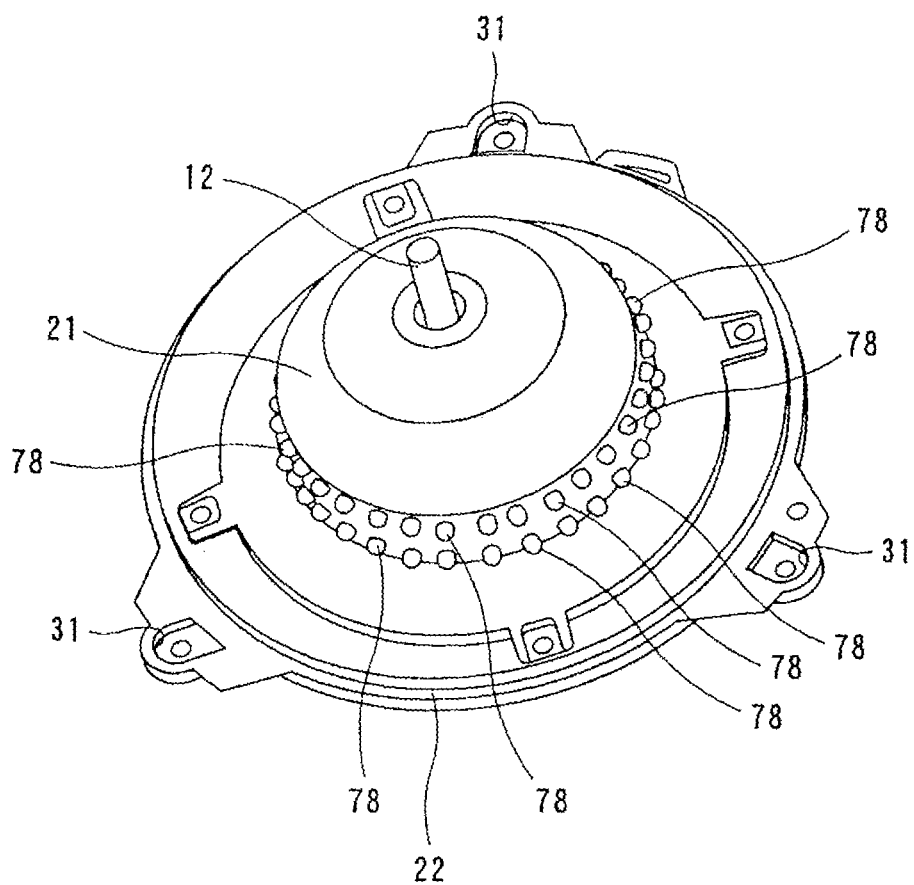
FIG. 17 is an explanatory view showing the configuration of a driving motor heat dissipation accelerator which is different from the one shown in FIG. 16, where another example of heat dissipation construction is described.

In both application of the driving motor 3 for a small volume of air shown in FIGS. 2, 4, and 5 and that for a large volume of air shown in FIGS. 8 and 14, the housing 21 may be configured to increase the surface area by forming a plurality of triangle ribs 77, as shown in FIG. 16, or by forming a plurality of bump protrusions 78, as shown in FIG. 17, further, although not shown, or by forming a plurality of recessed areas (dimples) protruding into inside of the housing 21. As a result, the rib 77, the protrusion 78 or the concave part (not shown) functions as a heat dissipation accelerator to promote the dissipation of heat from the housing 21, and therefore, it is possible to effectively dissipate the heat from the housing 21.

INDUSTRIAL APPLICABILITY

In all the embodiments of the present invention, an outer rotor motor in which a rotor assembly rotates along the outer periphery of the stator assembly has been described; however, needless to say, the present invention can be applied to an inner rotor motor in which the rotor assembly rotates along the inner periphery of the stator assembly. Moreover, the driving motor can be used in a blower unit of a vehicle air-conditioner.

EXPLANATION OF REFERENCE NUMERALS

1 Blower unit
2 Blower case
3 Driving motor
4 Multi-blade fan
12 Rotating shaft
13 Boss part
15 Blade
18 Stator assembly
19 Control circuit-board
20 Rotor assembly
21 Housing
22 Flange
23 Motor main body
24 Bearing
25 Bearing
29 Heat radiation component
35 Motor interior-space
36 Air duct
37 Slot insulator
44 Cylindrical gap
45 Elastic ring member
51 Cylindrical part
52 Cylindrical part
53 Cylindrical gap
54 Insertion hole
55 Flange
59 Elastic mounting member
68 Intervening elastic member
70 Receiving part
72 Peripheral edge elastic member
73a to 73j Fin protrusion
74 Rib
75 plate-shaped elastic member
77 Rib
78 Protrusion

The invention claimed is:

1. A driving motor for transmitting a rotation force to a rotor member so as to rotate the rotor member, wherein a motor main body includes: a rotating shaft for rotating the rotor member which is attached to one end in an axial direction; a rotor assembly being attached to the rotating shaft and rotating together with the rotating shaft; a stator assembly facing the rotor assembly in a radial direction of the rotating shaft and being arranged not rotating together with the rotating shaft; a control circuit-board that controls rotation of the rotating shaft as well as the rotor assembly; and a housing having a first opening which is formed in the relative vicinity of the rotor member and a second opening relatively spaced apart from the rotor member, whereas the housing extends from around of the rotating shaft to outward in a radial direction of the rotating shaft at the vicinity of one end, where it opens at the other end of the axial direction of the rotating shaft, and the housing at the other end of the axial direction of the rotating shaft is covered by a flange, thus the housing and the flange define a motor interior-space, and the housing, being made of a metal, is attached to a case in which an air duct is defined inside so that an external surface of the housing is exposed to the air duct, and at least the stator assembly is contained in the motor interior-space of the housing, wherein one end in the axial direction of the rotating shaft is protruding outwardly toward the rotor member side from the housing, and the other end in the axial direction of the rotating shaft is contained in the motor interior-space, and wherein the rotor assembly is also contained in the motor interior-space of the housing, the control circuit-board is arranged to be contained in the motor interior-space of the housing, being located in the vicinity of either one of the one end and the other end of the rotating shaft than the rotor assembly and the stator assembly in the axial direction of the rotating shaft, and a yoke is disposed to be contained in the motor interior-space of the housing, being located in the other one of either one of the one end and the other end in the axial direction of the rotating shaft.

2. The driving motor as defined in claim 1, wherein an elastic ring member is provided in a cylindrical gap between the first opening of the housing and the rotating shaft.

3. The driving motor as defined in claim 1, including a cone part that has a boss part to which the rotating shaft is fixed, the cone part which has a boss part and a first cylindrical part, which is positioned in outer circumference of the rotating shaft than the boss part and extending in an axial direction to the opposite end of the rotating shaft, while the housing has a second cylindrical part which extends in the axial direction of the rotating shaft to the boss part of the cone part and its outer radius being smaller than an inner radial size of the first cylindrical part, and it also has a first opening in which the rotating shaft is to be inserted, circumferential part of the first opening being extending toward the rotating shaft so as to form a flange with which, at a time of assembling the driving motor and the rotor member, the second cylindrical part, being housed in the first cylindrical part generates a space in a relatively complex manner.

4. The driving motor as defined in claim 1, including the rotating shaft, the rotor assembly, and the stator assembly which are integrally formed as a vibrator, and the vibrator is fixed to the flange through an elastic mounting member.

5. The driving motor as defined in claim 1, wherein an elastic member is interposed between the housing and the flange at a time of covering the second opening side of the housing, the intervening elastic member including three or more receiving parts each having a surface to interface the housing end surface which is opposing to the flange, wherein the receiving parts are arranged to surround the rotating shaft to support the motor main body.

6. The driving motor as defined in claim 1, wherein an elastic member is interposed between the housing and the flange at a time of covering the second opening side of the housing, the intervening elastic member to include a plurality of liner grooves in an area opposing to the second opening of the housing.

7. The driving motor as defined in claim 5, wherein the intervening elastic member is configured such that a spring constant in a rotating direction of the rotating shaft is smaller than a spring constant in an axial direction of the rotating shaft.

8. The driving motor as defined in claim 1, wherein at a time of covering the second opening side of the housing, the flange includes a peripheral edge elastic member on its surface which is facing the second opening of the housing, wherein the peripheral edge elastic member is compressed by a pressing force generated by the housing roughly in a radial direction of the rotating shaft, while at the same time the peripheral edge elastic member contacts a region near the second opening on an outer peripheral surface of the housing so that a compressing force does not work in the axial direction of the rotating shaft.

9. The driving motor as defined in claim 1, wherein a heat dissipation accelerator for enhancing dissipation of heat generated in the motor interior-space to outside the motor interior-space is arranged on a surface facing the rotor member.

10. The driving motor as defined in claim 1, wherein a surface facing the second opening of the housing of the flange has a rib which comprises a plurality of liner protrusions extending toward the housing.

* * * * *